United States Patent [19]
Hayashi

[11] Patent Number: 5,387,999
[45] Date of Patent: Feb. 7, 1995

[54] CAMERA SHAKE COMPENSATING OPTICAL SYSTEM

[75] Inventor: Kohtaro Hayashi, Suita, Japan

[73] Assignee: Minolta Co., Ltd., Osaka, Japan

[21] Appl. No.: 80,056

[22] Filed: Jun. 18, 1993

[30] Foreign Application Priority Data

Jun. 26, 1992 [JP] Japan .................... 4-168691
Mar. 31, 1993 [JP] Japan .................... 5-073378

[51] Int. Cl.$^6$ ............... G02B 15/14; G02B 27/64
[52] U.S. Cl. .................... 359/557; 359/554; 359/676; 359/683; 359/684; 359/685
[58] Field of Search ............ 359/556, 557, 558, 454, 359/676, 683, 684, 685; 350/423

[56] References Cited

U.S. PATENT DOCUMENTS 5,000,549 3/1991 Yamazaki ................... 350/423
5,039,211 8/1991 Matuyama ................. 359/557
5,182,671 1/1993 Kitagishi et al. .......... 359/557

Primary Examiner—Viet Q. Nguyen
Attorney, Agent, or Firm—Price, Gess & Ubell

[57] ABSTRACT

A camera shake compensating optical system has a first lens and a second lens from the object side. The image side surface of the first lens is convex to the object side. The object side surface of the second lens is convex to the object side. A direction in which a luminous flux is transmitted is slightly changed by a relative displacement of the second lens with respect to the first lens. By an obtained transmission deflection angle, blur of an image taken when the taking optical system is inclined is compensated for. The relative displacement is made so that an incident surface of the first lens and an exit surface of the second lens are not decentered from the optical axis of the taking optical system.

7 Claims, 34 Drawing Sheets

Fig. 2a
PRIOR ART
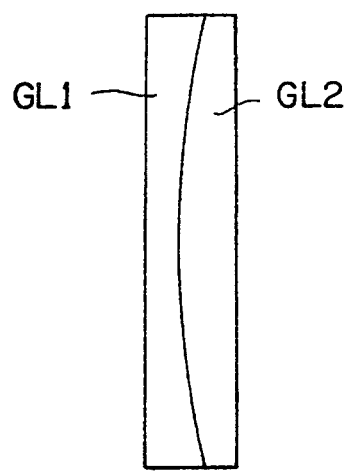
GL1  GL2
Fig. 2b
PRIOR ART
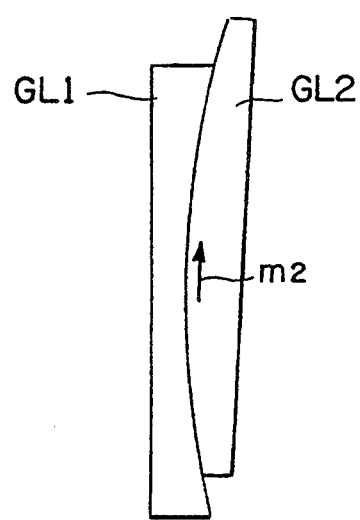
GL1  GL2
m2

Focal length of G1 & G2 = approximately 5.7 mm

Fig. 8  Amount of over compensation of off-axial light beam at each focal length (Nd=1.7, Enp=10)

Fig. 9 Taking optical system to which the 1st embodiment is added (before decentering, at the shortest focal length condition)

Fig. 11
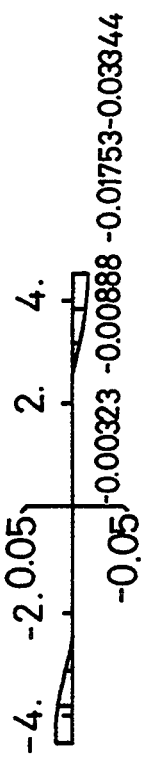
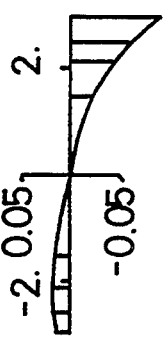
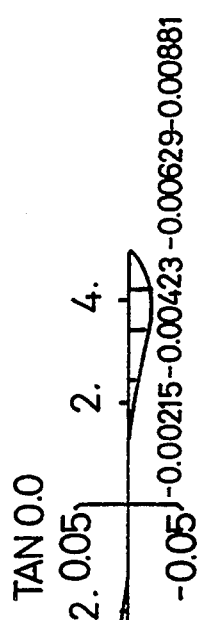
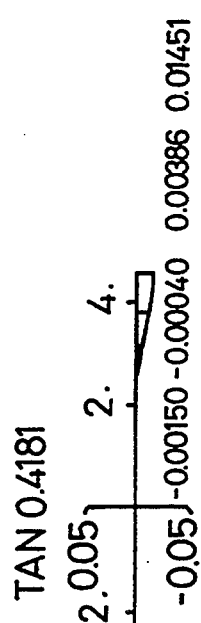
Taking optical system to which the 1st embodiment is added (after decentering, at the shortest focal length condition)

Fig. 12
Taking optical system to which the 1st embodiment is added
(after decentering, at the longest focal length condition)
Lateral aberration on Gaussian plane (in the meridional direction) −d
fALL=76.800 FNO=7.76
TAN-0.1953
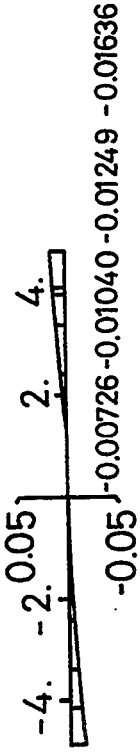
TAN0.0
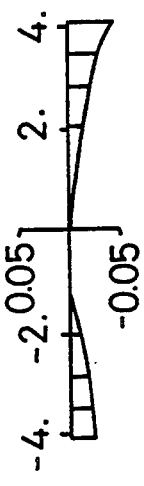
TAN0.1953
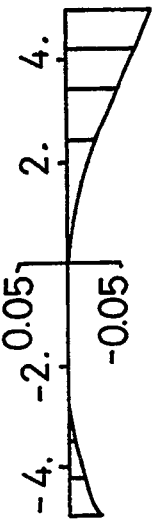
Lateral aberration on Gaussian plane (in the sagittal direction) −d
fALL=76.800 FNO=7.76
TAN-0.1953 −0.00726 −0.01040 −0.01249 −0.01636
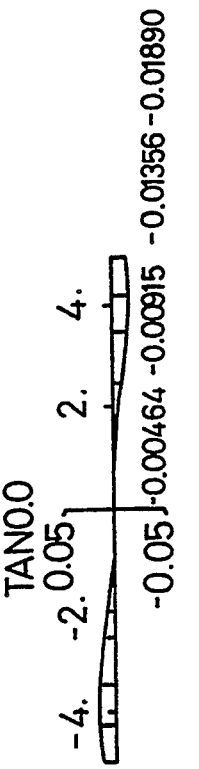
TAN0.0 −0.00464 −0.00915 −0.01356 −0.01890
TAN0.1953 −0.00199 −0.00703 −0.01454 −0.02128
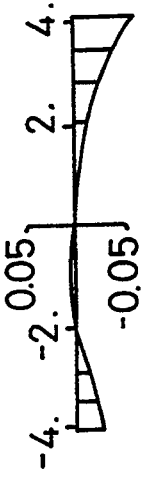

Fig. 13
Taking optical system to which the 1st embodiment is added where R2 and R3 are aspherical (after decentering, at the shortest focal length condition)
Lateral aberration on Gaussian plane (in the meridional direction) —d
Lateral aberration on Gaussian plane (in the sagittal direction) —d
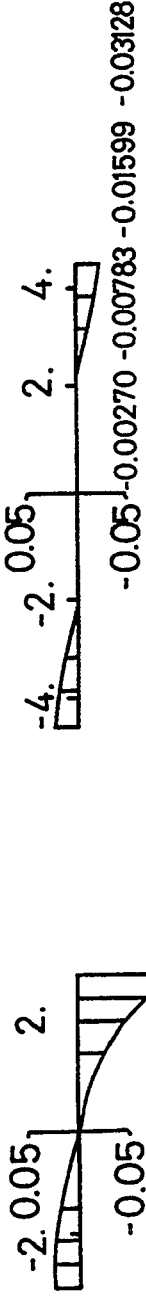
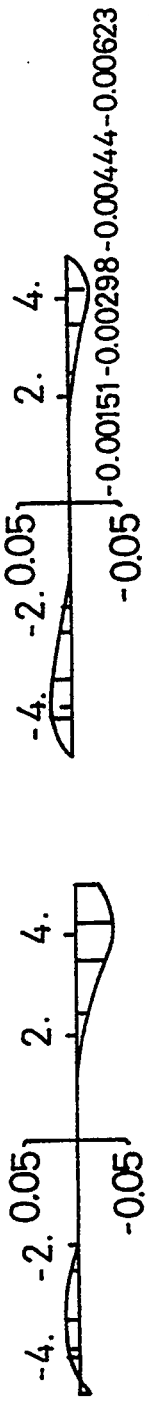
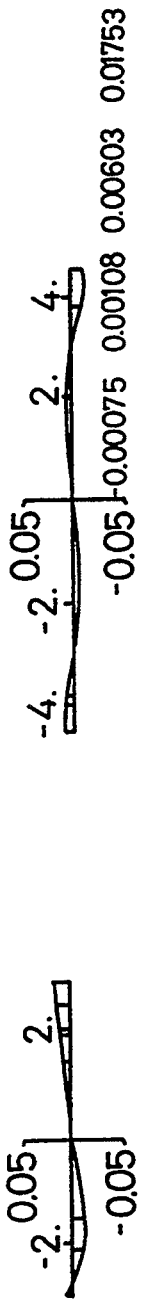

Fig.14 Taking optical system to which the 1st embodiment is added where R2 and R3 are aspherical
(after dentering, at the longest focal length condition)
Lateral aberration on Gaussian plane (in the meridional direction) —d
Lateral aberration on Gaussian plane (in the sagittal direction) —d
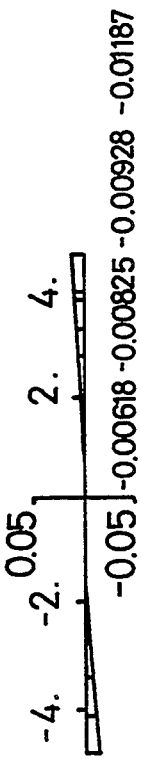
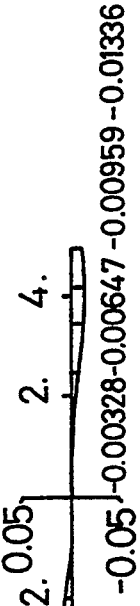
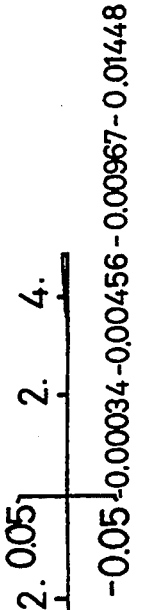
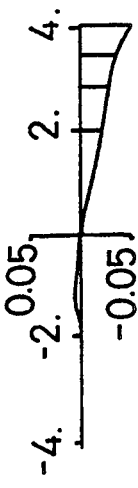
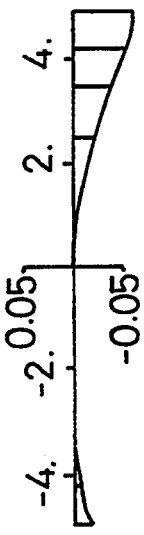
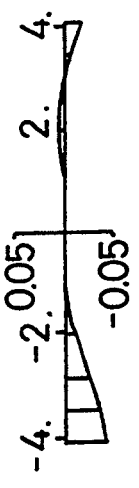

Fig.19
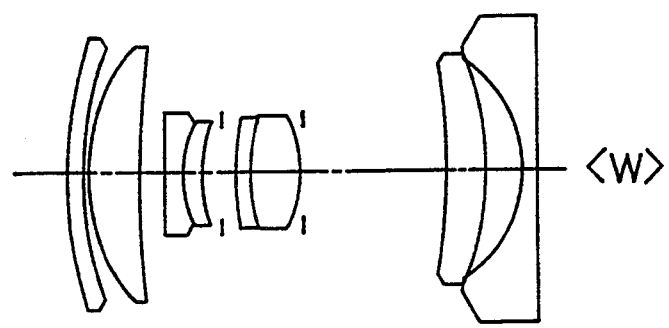
⟨W⟩
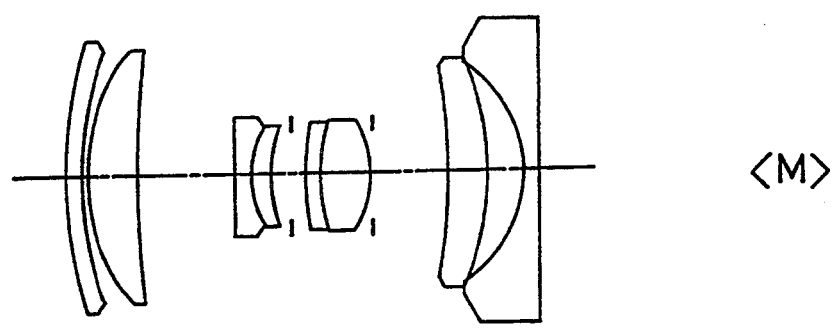
⟨M⟩
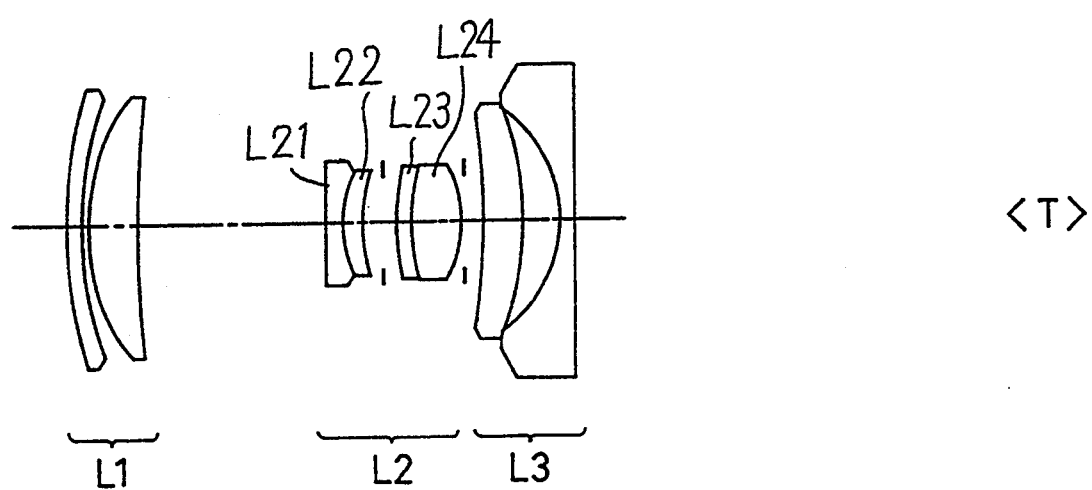
⟨T⟩

Fig. 25
Taking optical system to which the 6th embodiment is added (before decentering, at the shortest focal length condition)
Lateral aberration on Gaussian plane (in the meridional direction) ——d
Image height −15mm
Image height +15mm
Image height 0
Lateral aberration on Gaussian plane (in the sagittal direction) ——d
Image height −15mm
Image height +15mm Fig. 26
Taking optical system to which the 6th embodiment is added (before decentering, at the longest focal length condition)
Lateral aberration on Gaussian plane (in the meridional direction) —d
Lateral aberration on Gaussian plane (in the sagittal direction) —d
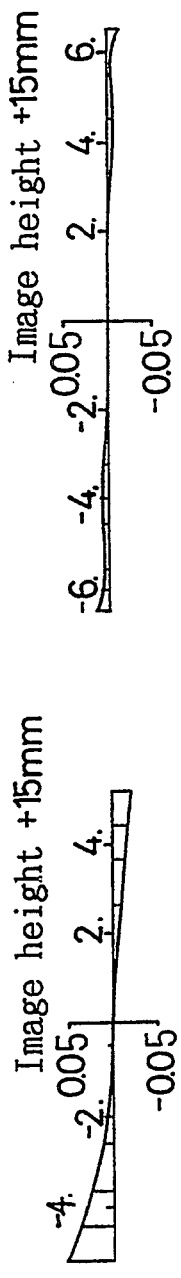
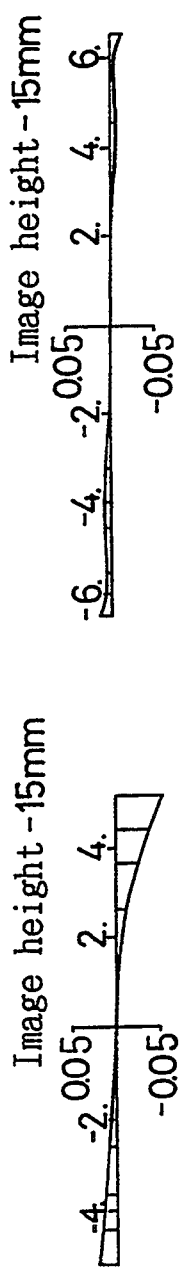
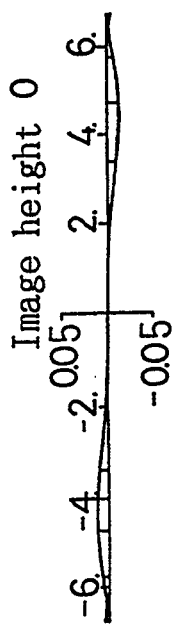

Fig. 27
Taking optical system to which the 6th embodiment is added (after decentering, at the shortest focal length condition)
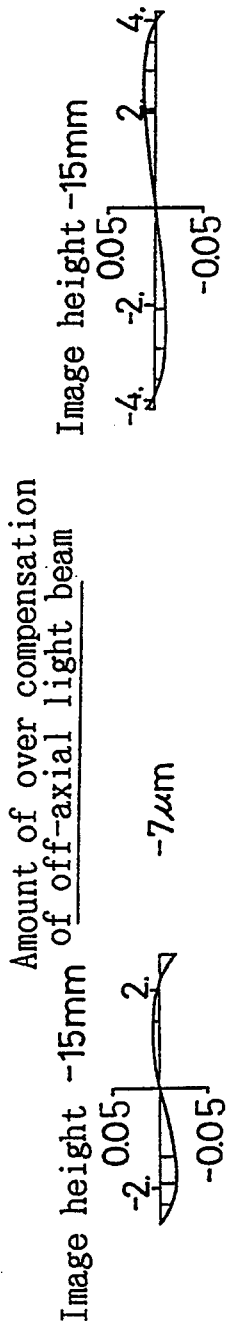

Fig. 28
Taking optical system to which the 6th embodiment is added (after decentering, at the longest focal length condition)
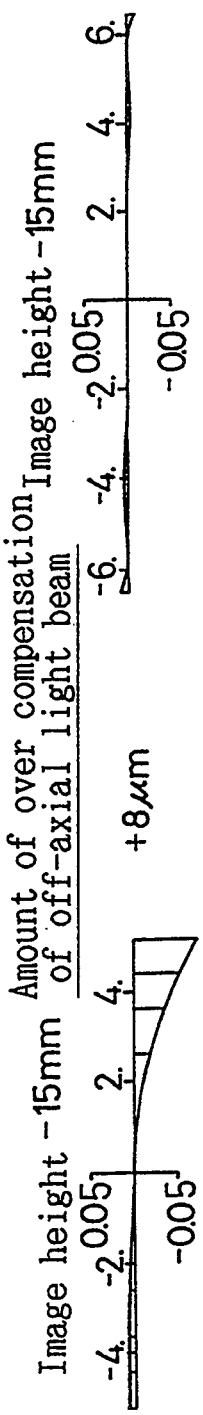
Lateral aberration on Gaussian plane (in the meridional direction) —d
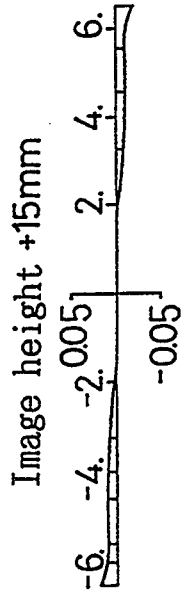
Amount of over compensation of off-axial light beam
$+8\mu m$
$+6\mu m$
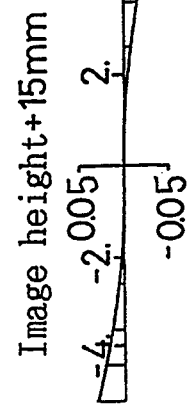
Lateral aberration on Gaussian plane (in the sagittal direction) —d

Fig. 31
Taking optical system to which the 7th embodiment is added (before decentering, at the longest focal length condition)
Lateral aberration on Gaussian plane (in the meridional direction) —d
Lateral aberration on Gaussian plane (in the sagittal direction) —d
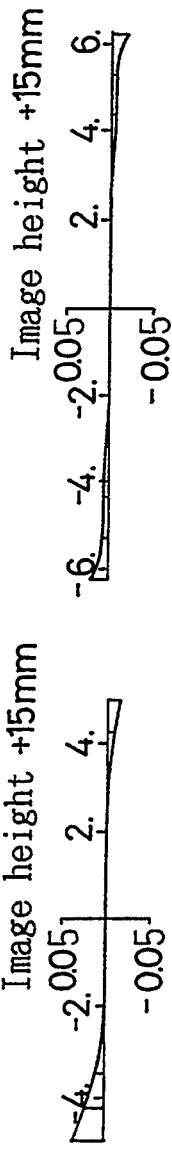
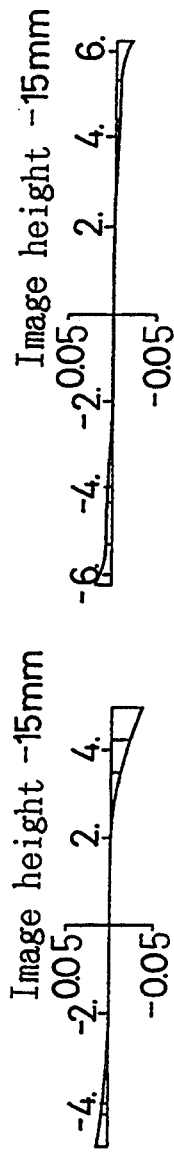
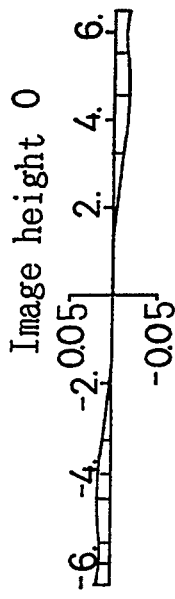

Fig. 32
Taking optical system to which the 7th embodiment is added (after decentering, at the shortest focal length condition)
Lateral aberration on Gaussian plane (in the meridional direction) —— d
Lateral aberration on Gaussian plane (in the sagittal direction) —— d
Amount of over compensation of off-axial light beam
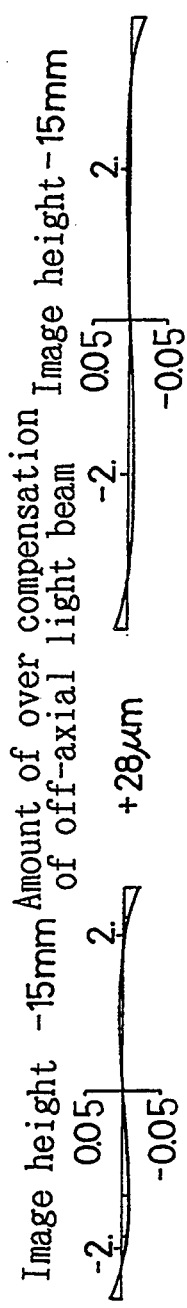
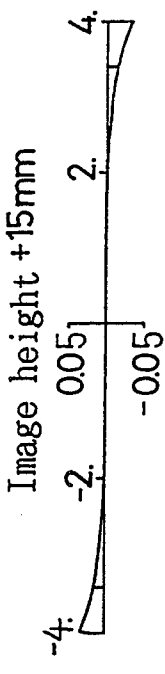
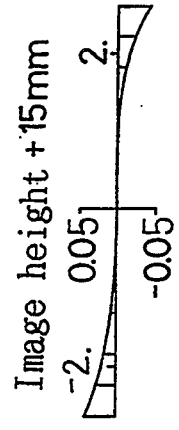
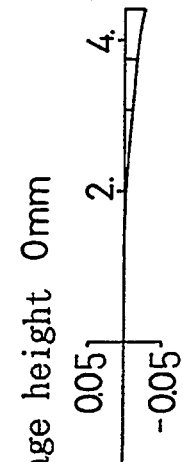
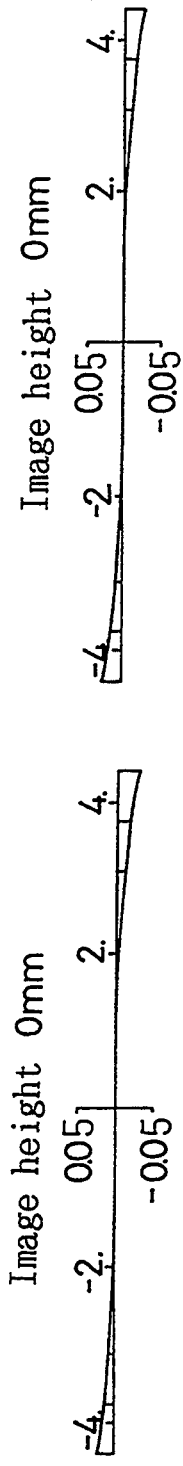

Fig. 33

Taking optical system to which the 7th embodiment is added (after decentering, at the longest focal length condition)

Lateral aberration on Gaussian plane (in the meridional direction) — d

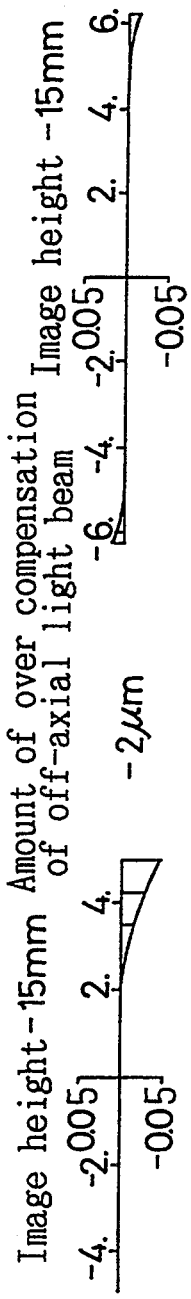

Image height -15mm

Image height +15mm

Image height 0mm

Amount of over compensation of off-axial light beam —2μm

Lateral aberration on Gaussian plane (in the sagittal direction) — d

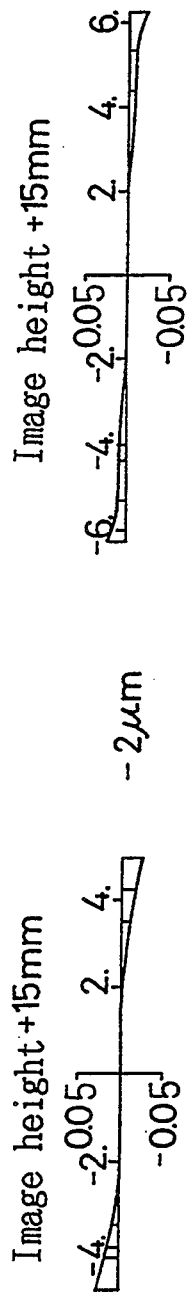

Image height -15mm

Image height +15mm

Image height 0mm

CAMERA SHAKE COMPENSATING OPTICAL SYSTEM

BACKGROUND OF THE INVENTION

1. Field of the Invention

The present invention relates to a camera shake compensating optical system for compensating for blur of an image taken when a taking optical system inclines due to camera shake caused at the time of photographing performed while the camera is being held by the hands.

2. Description of the Prior Art

Conventionally, failures in photographing mostly resulted from camera shake and being out of focus. However, since most of the recent cameras are provided with an automatic focusing mechanism and the automatic focusing mechanism has improved focusing accuracy, the problem of the photographing failure due to being out of focus has been nearly solved.

On the other hand, the lens system normally incorporated in the camera has shifted from a fixed focal length lens system to a zoom lens system, and with the shift, the magnification and the longest focal length have been increased. Consequently, camera shake very frequently occurs.

As a result, presently, it is no exaggeration to say that the failure in photographing is caused by camera shake. For this reason, an optical system for compensating for image blur due to camera shake is indispensable.

Conventionally, a variable vertical angle prism has been known as an optical system for compensating for the image blur which optical system is added to a taking optical system which is a main optical system (Japanese Laid-open Patent Application No. S50-112054). As examples of the variable vertical angle prism, the following two are well known: the one (first prior art) in which a liquid L is enclosed between two glass plates GP1 and GP2 as shown in FIG. 1(a) and the glass plates GP2 is inclined by moving one end thereof (in the direction of arrow m1) as shown in FIG. 1(b); and the one (second prior art) in which a plano-concave lens GL1 and a plano-convex lens GL2 are attached to each other at the spherical surfaces as shown in FIG. 2(a) and one of the lenses is decentered along the attached spherical surfaces (in the direction of arrow m2) as shown in FIG. 2(b).

U.S. Pat. No. 2,959,088 proposes an afocal lens system including a concave lens and a convex lens in which the convex lens is rotated about the focus position of the convex lens. In this system, an angle of camera shake (an angle at which a light beam is to be bent) and an angle of compensation (an angle at which the convex lens is rotated) are of the same magnitude but in the opposite direction. Since the optical axis of the convex lens is always horizontal by means of a weight, the optical axis of the convex lens is not moved by any position changes, so that camera shake is compensated for. With such an arrangement, this lens system requires no detecting system for detecting camera shake amount and no driving system.

As another optical system for compensating for camera shake, Japanese Laid-open Patent Application No. H2-93620 proposes an optical system in which a part of a taking optical system is decentered.

Japanese Laid-open Patent Applications Nos. H1-116619, H1-189621, H1-191112 and H1-191113 disclose numerical embodiments of three-unit zoom lens systems (concave, convex and concave from the object side) in which camera shake is compensated for by independently decentering each lens unit.

Problems encountered by the variable vertical angle prism will be described with reference to FIGS. 3 and 4.

FIG. 3 shows a variable vertical angle prism (third prior art) including a plano-concave lens G1 and a plano-convex lens G2. Surfaces R1 and R4 are nearly plane surfaces. Surfaces R2 and R3 are spherical surfaces with a radius of curvature of approximately 40 mm. The absolute values f1 of the focal lengths of lenses G1 and G2 are both approximately 57 mm. The lenses G1 and G2 constitute an afocal system. In the figure, the numerals $-20$, $-15$, $-10$, $0$, $+10$, $+15$, $+20$ on the left side of the variable vertical angle prism represent image heights when the focal length of the taking optical system is 35 mm. Optical paths of incident light beams corresponding to the image heights are also shown.

FIG. 4 shows a condition in which the lens G2 is decentered along the spherical surface R3. Since the center of decentering is the center of curvature of the spherical surface R3, even though the spherical surface R3 moves by the decentering of the lens G2, optically, the position of the spherical surface R3 does not change. On the other hand, the plane surface R4 inclines as the lens G2 is decentered. As a result, a transmission deflection angle is obtained similarly to the previously-mentioned second prior art (FIG. 2). The dotted lines in the figure represent the position of the variable vertical angle prism and optical paths (FIG. 3) before the decentering.

In this third prior art, in order to correct an axial light beam by 1°, the lens G2 is rotated by approximately 1.4° along the spherical surface R3. With this arrangement, a transparent optical device is obtained which is equivalent to the case where a wedge-shaped prism with a vertical angle of approximately 1.4°.

However, as shown in FIG. 4, when the taking optical system is of a wide angle (focal length: 35 mm) as described above, a light beam off an optical axis AX of the taking optical system (hereinafter referred to as off-axial light beam) is bent by as much as 1.27° at the most with respect to a compensation angle of 1.01° of a light beam on the optical axis AX (hereinafter referred to as axial light beam). This means that when blur of an axial image due to camera shake is compensated for, an off-axial image is over-compensated for, which adversely causes image blur. The amount of the blur caused by the over compensation is as much as 106 μm in the case of compensation in a taking optical system with a focal length of 35 mm and an image height of 15 mm.

From the above, it is found that in a case where the film size is 35 mm, it is when the focal length is 100 mm or larger and the maximum taking angle of view is up to approximately 12° that both axial and off-axial images of the taking optical system can excellently be compensated for by means of the variable vertical angle prism.

On the other hand, the system of the above-mentioned U.S. Pat. No. 2,959,088 presents the following problems. First, since the center of rotation of the convex lens is away from the convex lens, in order to support the convex lens by means of a gimbal, the size of the system should be increased. Secondly, similarly to the case of the variable vertical angle prism, the off-axial light beam is over-compensated for when the taking optical system has a short focal length.

FIG. 5 shows a system (fourth prior art) where in a system similar to that of the third prior art, the lens G2 is rotated about its focus position similarly to the one proposed by U.S. Pat. No. 2,959,088. In the system of the fourth prior art, in order to compensate for the axial light beam by 1°, the lens G2 is rotated about its focus position by approximately 1°. However, as shown in the figure, the off-axial light beam is over-compensated for by 20% with respect to the compensation of approximately 1° of the axial light beam.

Japanese Laid-open Patent Applications Nos. H2-238429 to H2-238431, H2-239220, H2-239221, and H2-240622 to H2-240624 also propose optical systems with the same object as that of U.S. Pat. No. 2,959,088. In these optical systems, in order to decrease the demerit of U.S. Pat. No. 2,959,088 that the size is large, the distance from the convex lens to the center of rotation is made shorter than the focal length of the convex lens by changing the power distribution. However, the problem that the size is large has not completely been solved.

Moreover, the over compensation of the off-axial light beam is larger than that of U.S. Pat. No. 2,959,088. Japanese Laid-open Patent Application No. H2-238429 teaches in its specification that images off the optical axis do not move either. However, this is with respect to the paraxial ray tracing and the over compensation results from the fact that the paraxial theory does not apply to the wide angle. In this method, in order to solve the problem of the over compensation of the off-axial light beam, it is necessary to increase the number of lens elements in both the concave and the convex lens units. If the number of lens elements increases, the cost will inevitably increase.

In the system of the above-mentioned Japanese Laid-open Patent Application No. H2-240624, since the concave lens unit and the convex lens unit are away from each other and the rear surface of the convex lens is inclined by the decentering of the convex lens, it is difficult to make excellent compensation at a wide angle lens. Moreover, the number of lens elements of the camera shake compensating optical system is as large as four and the diameter thereof is large, the size is large and the cost is high.

In the above-mentioned system where a part of the taking optical system is decentered, it is necessary to decenter a lens in accordance with each taking optical system. Particularly in the zoom lens system, it is extremely difficult to compensate for camera shake while maintaining an excellent image at any focal length during zooming.

In the system of the above-mentioned Japanese Laid-open Patent Application No. H1-116619 where the first lens unit is decentered, the over compensation amount of the off-axial light beam is considerably large at the shortest focal length condition and the aberration deterioration due to the decentering is remarkable at the longest focal length condition. In the system of Japanese Laid-open Patent Application No. H1-116619 where the second and third lens units are decentered, the displacement amount of the decentered lens unit for compensating for camera shake is changed when the focal length of the zoom lens system is changed. As a result, in order to calculate the displacement amount of the decentered lens unit, highly accurate information is required on the camera shake angle and the focal length of the zoom lens system. Since in consideration of the non-uniformity of each part, a considerably complicated adjustment is required, the system of this prior art is unsuitable for mass production.

SUMMARY OF THE INVENTION

An object of the present invention is to provide a camera shake compensating optical system being compact and capable of excellently compensating for blur of both axial and off-axial images of the taking optical system.

To achieve the above-mentioned object, in a camera shake compensating optical system of the present invention for use in a zoom lens system, blur of an image taken when the zoom lens system is inclined is compensated for by a decentering of a compensating lens, said compensating lens being situated at a position on an object side of an aperture stop of said zoom lens system, wherein as a focal length of said zoom lens system shifts from a shorter focal length condition to a longer focal length condition, the position of said compensating lens at least does not shift relative to said aperture stop or shifts toward the object side so as to be further away from the aperture stop, and wherein the following condition is fulfilled:

$$0.22 \leq FLw \times \Sigma(\Phi i \times \Theta i)$$

where $FLw$ represents a shortest focal length of the entire system including the camera shake compensating optical system and the zoom lens system; $\Phi i$ represents a power of a surface to be displaced due to the decentering of the compensating lens; $\Theta i$ represents an angle of optical inclination of the surface to be displaced with respect to an optical axis of a taking lens when the compensating lens is decentered so that a principal light beam from an object is bent by 1° in a counterclockwise direction by the camera shake compensating optical system; and $\Sigma$ represents a total sum with respect to all of the surfaces to be displaced by the decentering of the compensating lens.

BRIEF DESCRIPTION OF THE DRAWINGS

This and other objects and features of this invention will become clear from the following description, taken in conjunction with the preferred embodiments with reference to the accompanied drawings in which:

FIG. 2(a) and FIG. 2(b) show lens arrangements of a second prior art before and after the decentering;

FIG. 11 shows lateral aberrations of the taking optical system to which the first embodiment of the present invention is added at the shortest focal length condition after the decentering of the lens G2;

FIG. 12 shows lateral aberrations of the taking optical system to which the first embodiment of the present invention is added at the longest focal length condition after the decentering of the lens G2;

FIG. 13 shows lateral aberrations of the taking optical system to which the first embodiment of the present invention is added at the shortest focal length condition after the decentering of the lens G2 when the surfaces R2 and R3 are aspherical surfaces with $\epsilon = 0.5$;

FIG. 14 shows lateral aberrations of the taking optical system to which the first embodiment of the present invention is added at the longest focal length condition after the decentering of the lens G2 when the surfaces R2 and R3 are aspherical surfaces with $\epsilon = 0.5$;

FIG. 19 shows lens arrangements of a taking optical system before the fifth embodiment is added thereto at the shortest, middle and longest focal length conditions;

FIG. 25 shows lateral aberrations of the taking optical system to which the sixth embodiment of the present invention is added at the shortest focal length condition before the decentering of a lens G2;

FIG. 26 shows lateral aberrations of the taking optical system to which the sixth embodiment of the present invention is added at the longest focal length condition before the decentering of the lens G2;

FIG. 27 shows lateral aberrations of the taking optical system to which the sixth embodiment of the present invention is added at the shortest focal length condition after the decentering of the lens G2;

FIG. 28 shows lateral aberrations of the taking optical system to which the sixth embodiment of the present invention is added at the longest focal length condition after the decentering of the lens G2;

FIG. 31 shows lateral aberrations of the taking optical system to which the seventh embodiment of the present invention is added at the longest focal length condition before the decentering of the lens G2;

FIG. 32 shows lateral aberrations of the taking optical system to which the seventh embodiment of the present invention is added at the shortest focal length condition after the decentering of the lens G2;

FIG. 33 shows lateral aberrations of the taking optical system to which the seventh embodiment of the present invention is added at the longest focal length condition after the decentering of the lens G2;

DESCRIPTION OF THE PREFERRED EMBODIMENTS

Figure 6:
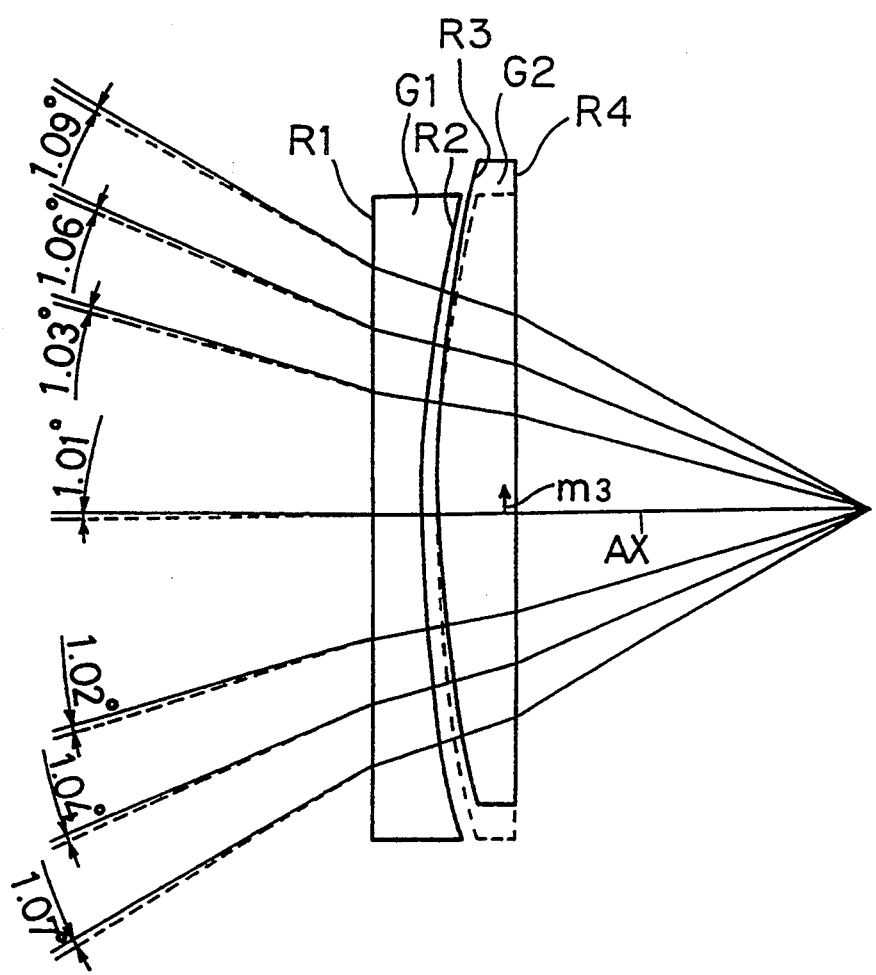
FIG. 6 shows a lens arrangement and optical paths of a first embodiment of the present invention.

Hereinafter, embodiments of the present invention will be described with reference to the drawings. FIG. 6 shows a lens arrangement of a first embodiment of the present invention. Numerical data of this embodiment are shown in Table 1 together with numerical data of a taking optical system to which this embodiment is added. A camera shake compensating optical system (hereinafter sometimes referred to as compensating optical system) comprises from the object side a concave lens (first lens) G1 and a convex lens (second lens) G2. The image side surface of the concave lens G1 is convex to the object side, while the object side surface of the convex lens G2 which faces the convex surface of the lens G1 is convex to the object side. The most object side surface R1 and the most image side surface R4 of this embodiment are substantially plain surfaces. A surface R2 of the lens G1 and a surface R3 of the lens G2 are arranged with a very small space therebetween, are both convex to the object side, and are approximately in parallel with each other. That the spherical surfaces R2 and R3 are approximately in parallel with each other means that the center of curvatures of the spherical surfaces R2 and R3 are situated at approximately the same position and that the normal lines at corresponding points on the spherical surfaces are approximately in parallel with each other. In the figure, optical paths of incident light beams corresponding to each image height are also shown.

In this embodiment, the direction of a luminous flux transmitted through the combination of the concave lens G1 which is a first transparent optical device and the convex lens G2 which is a second transparent optical device is slightly changed by a relative displacement of the lenses G1 and G2, and by a transmission deflection angle obtained by the change of direction of the luminous flux, the blur of an image taken when the taking optical system inclines is compensated for. The above-mentioned relative displacement is performed while maintaining a condition where the incident surface R1 of the concave lens G1 and the exit surface R4 of the convex lens G2 are not decentered from an optical axis AX of the taking optical system. That is, the relative displacement is performed so that a condition of a surface at an arbitrary distance from the optical axis AX of the taking optical system does not differ between before and after the relative displacement with respect to the incident surface R1 of the concave lens G1 and the exit surface R4 of the convex lens G2 in compensating for the blur of the taken image. At this time, rotation symmetry is maintained between the incident surface R1 of the concave lens G1 and the exit surface R4 of the convex lens G2 with respect to the optical axis AX of the taking optical system.

Specifically, camera shake compensation in this embodiment is performed by parallel decentering of the convex lens G2 in a direction vertical to the optical axis AX (in the direction of arrow m3) (hereinafter, a lens like the convex lens G2 which is decentered for compensating for camera shake will be sometimes referred to as compensating lens). This is because the surface R4, which is a plain surface vertical to the optical axis AX, does not incline with respect to the optical axis AX due to the above-mentioned decentering and does not change optically. However, the parallelism between the spherical surface R2 and the spherical surface R3 is broken. This results from a deviation of the center of curvature of the spherical surface R3 from the center of curvature of the spherical surface R2 due to the parallel decentering of the convex lens G2.

In this embodiment, the convex lens G2 is moved in a direction opposite to the direction of camera shake. As a mechanism for sensing camera shake to move the lens G2, for example, an acceleration sensor and an actuator such as the ones shown in Japanese Laid-open Patent Application No. S62-47011 can be used.

Figure 1A:
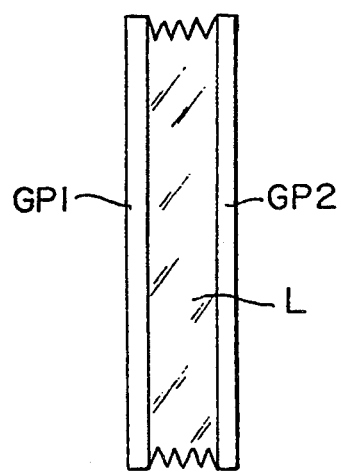
FIG. 1(a) and FIG. 1(b) show lens arrangements of a first prior art before and after the decentering.
Figure 1B:
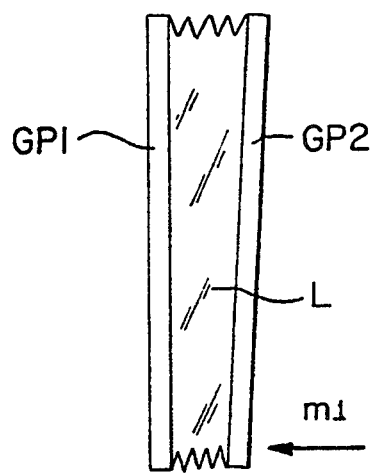
Figure 3:
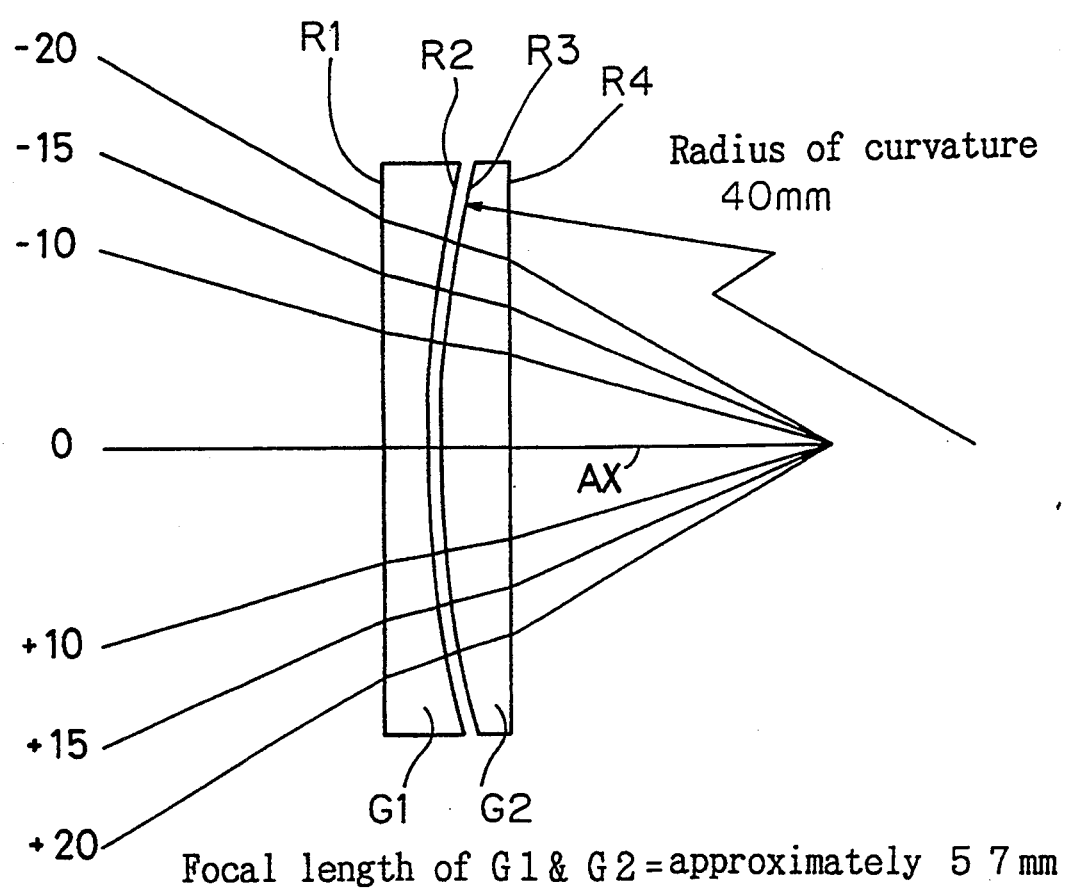
FIG. 3 shows a lens arrangement and optical paths of a third prior art before and after the decentering.
Figure 4:
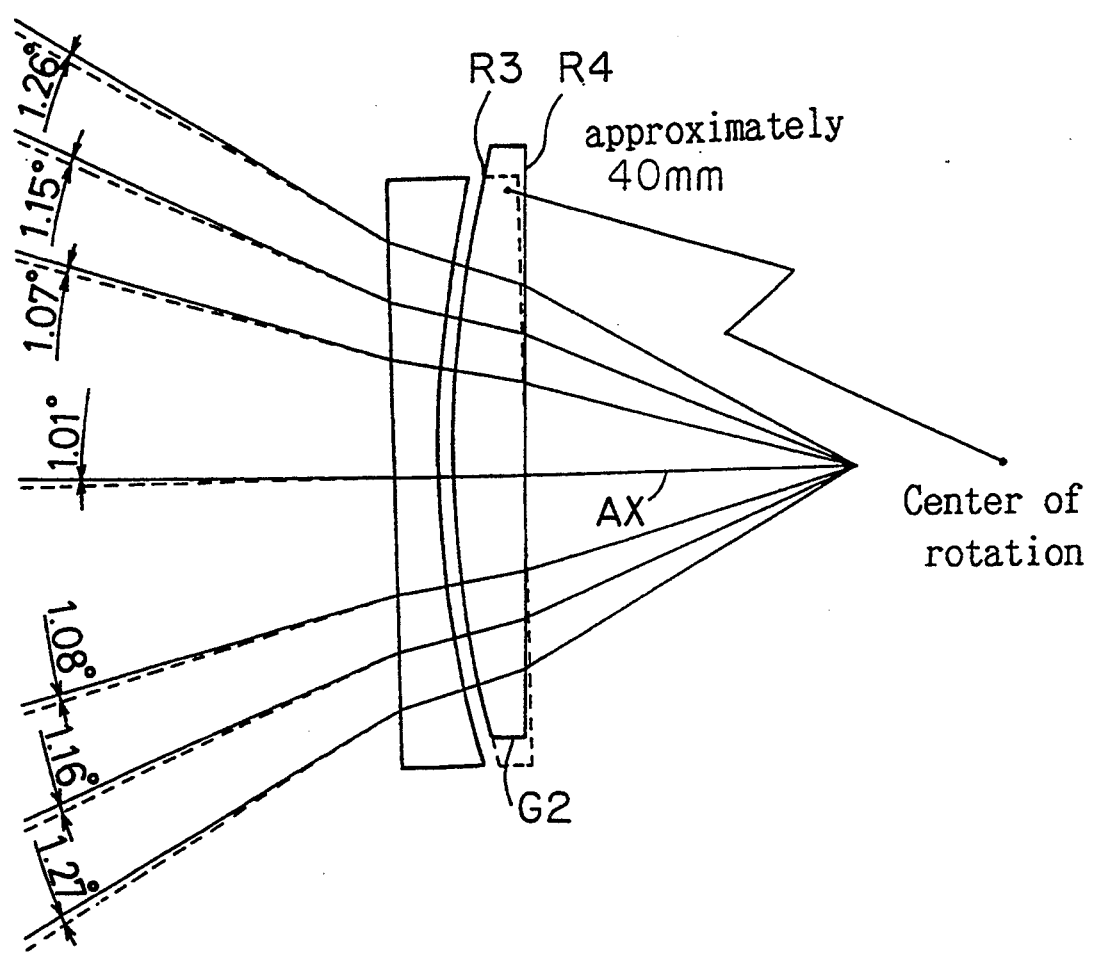
FIG. 4 shows a lens arrangement and optical paths of the third prior art before and after the rotational decentering with the spherical center of a spherical surface R3 as the center of rotation.
Figure 5:
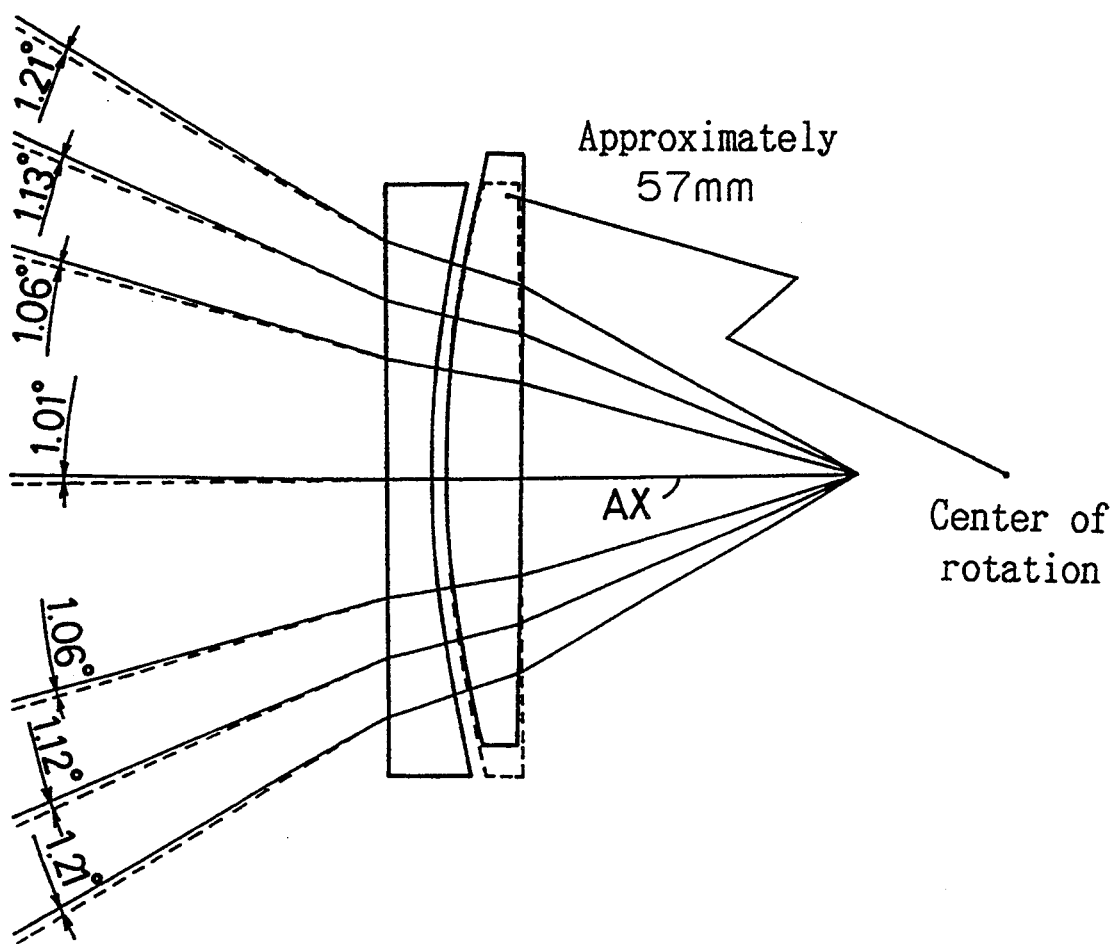
FIG. 5 shows a lens arrangement and optical paths of a fourth prior art before and after the rotational decentering with the focus position of a spherical surface R3 as the center of rotation.

In the previously-mentioned variable vertical angle prism (third prior art) shown in FIG. 4, the reason why the off-axial light beam is bent by as much as 1.27° at the most to be over-compensated for is that although the angle of incidence of the axial light beam on the prism is approximately 0°, the angle of incidence of the off-axial light beam on the prism is large.

On the contrary, in this embodiment, as shown in FIG. 6, a wedge effect is obtained by not providing inclination to the incident surface R1 and the exit surface R4 and by providing inclination to the facing surfaces R2 and R3 of the lenses G1 and G2. The wedge effect is that a transmission deflection angle can be obtained by a change of direction of a luminous flux made by slightly changing the direction of the luminous flux transmitted through a transparent optical device similarly to the case of the above-mentioned variable vertical angle prism.

If inclination is provided to the incident surface R1 and the exit surface R4, although there is no difference from the conventional variable vertical angle prism, since the surfaces R2 and R3 are spherical surfaces convex to the object side, the angle of incidence of the off-axial light beam on the surfaces R2 and R3 will be small compared to the angle of incidence of the off-axial light beam on the surfaces R1 and R4. As a result, no over compensation occurs; the off-axial light beam is excellently compensated for similarly to the axial light beam.

As shown in FIG. 6, in this embodiment, the difference between the compensation angle of the off-axial light beam and that of the axial beam is slightly less than 0.1°, from which it is understood that the amount of over compensation is restrained to an extremely small amount. In a case where this embodiment is added to a taking optical system with a focal length of 35 mm and an image height of 15 mm, the amount of blur caused by over compensation of the off-axial light beam is 39 µm, which is nearly one-third of that of the case of the variable vertical angle prism (FIG. 4). In the variable vertical angle prism, the amount of blur is 106 µm as previously described.

Since the compensating optical system of this embodiment is afocal as a whole and its angular magnification is close to 1, it is unnecessary to change the focal length and the back focal length of the taking optical system, and the aberration performance of the taking optical system does not deteriorate. In order for the aberration performance of the taking optical system not to deteriorate, it is necessary to restrain the focal length of the taking optical system from changing by more than 20% when the compensating optical system is added. Therefore, it is preferable that an overall power $\Phi$ and an angular magnification $\gamma$ of the compensating optical system fulfill the following conditions (1) and (2):

$$|\Phi|/\Phi f < 0.2 \quad (1)$$

$$0.8 < \gamma < 1.2 \quad (2)$$

where $\Phi$ represents the power of the compensating optical system, $\Phi f$ represents a power of the taking optical system, and $\gamma$ represents the angular magnification of the compensating optical system.

In order to fulfill the conditions (1) and (2) and to maintain an image in an excellent condition even when the compensating lens G2 is decentered, it is preferable that the facing spherical surfaces R2 and R3 are as close to each other as possible. In order for the spherical surfaces R2 and R3 to be as close to each other as possible without abutting due to the decentering, it is preferable that a distance d between the spherical surfaces R2 and R3 fulfills that following condition (3):

$$d < r3/20 \quad (3)$$

where r3 represents a radius of curvature of the third surface with a curvature $C_0 = 1/r3$.

Figure 8:
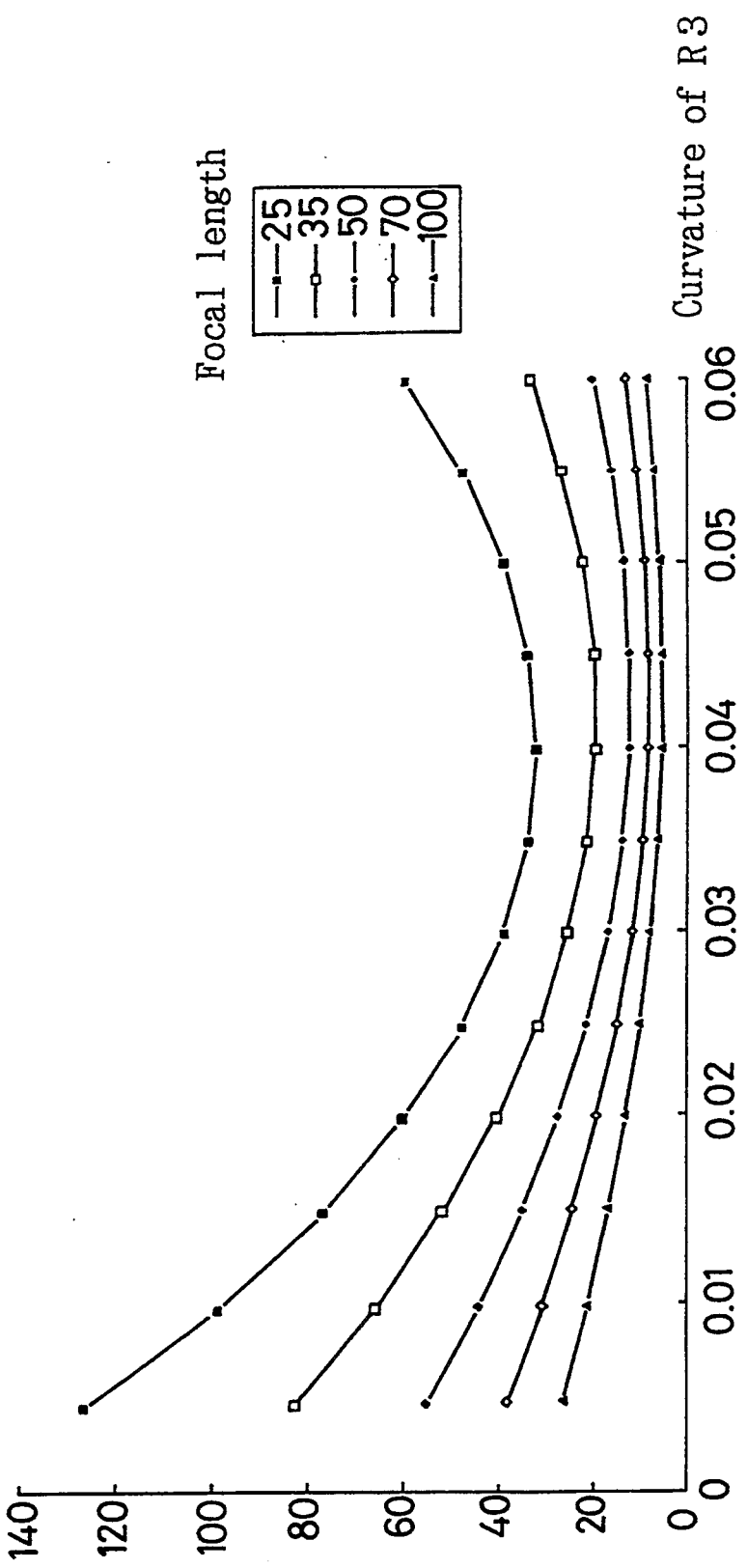
FIG. 8 graphically shows relationships between the curvature of a spherical surface R3 and the amount of over compensation in the first embodiment of the present invention.

The radii of curvature of the facing spherical surfaces R2 and R3 shown in FIG. 6 will be described. FIG. 8 graphically shows the amount of over compensation of the off-axial light beam at each focal length. When the lens G2 is moved in a manner where the surface R4 does not move at r1=r4= ∞ and r2=r3 where r1 to r4 represent radii of curvature of the surfaces R1 to R4, respectively (that is, the parallel decentering is performed), to make compensation so that the axial light beam is bent by 1°, the amount of over compensation of the off-axial light beam varies as shown in FIG. 8.

As the curvature $C_0 (=1/r3)$ increases, that is, as the radius of curvature of the surface R3 decreases (at this time, the radius of curvature of the surface R2 similarly decreases), the amount of over compensation decreases.

The amount of over compensation is the smallest approximately at $C_0=0.04$. As the curvature $C_0$ increases therefrom, the amount of over compensation increases.

The above-mentioned amount of over compensation is also dependent on a distance $E_{np}$ between the compensating optical system and the entrance pupil of the taking optical system, and can approximately be expressed by the following expression (4):

Over compensation amount $$\approx \{(4 \times E_{np} \times C_0 - 1.68)^2 + 0.73\}/f \quad (4)$$

where f represents a focal length of the taking optical system.

The above-mentioned amount of over compensation is preferably 60 μm or less. In order to realize a compact compensating optical system, it is not preferable that the distance $E_{np}$ between the compensating optical system and the entrance pupil of the taking optical system is too long. It is preferable that the distance $E_{np}$ is substantially 5 to 20 mm.

Hence, from the above expression (4), the following condition (5) is preferably fulfilled:

$$0.021 - (1/80).(0.06f - 0.73)^{\frac{1}{2}} \leq C_0 \leq 0.084 + (1/20).(0.06f - 0.73)^{\frac{1}{2}} \quad (5)$$

The condition (5), which is a condition applied to the case of 35 mm film, is extended to another format as:

$$(0.454/Y') - (0.27/Y').((1.3/\tan\omega) - 0.73)^{\frac{1}{2}} \leq C_0 \leq (1.816/Y') + (1.808/Y').((1.3/\tan\omega) - 0.73)^{\frac{1}{2}} \quad (6)$$

where Y' represents a maximum image height at an image formed surface of the taking optical system, and ω represents an angle of view at the maximum image height of the image formed surface of the taking optical system.

When the image formed surface is the 35 mm film, Y' is approximately 21.6 mm. Moreover, $Y' = -f\tan\omega$ holds with respect to ω. In the case of the zoom lens system, since the over compensation is apt to occur at the shorter focal length condition, the condition $Y' = -f\tan\omega$ is preferably fulfilled at the shorter focal length condition.

Hence, it is preferable that the second and third surfaces from the object side are convex to the object side, that the third surface is displaced to compensate for blur, and that the conditions (1), (2), (3) and (6) are fulfilled.

Numerical data of the taking optical system to which the first embodiment is added are shown in Table 1 together with the numerical data of the first embodiment. In the table, ri (i=1,2,3, ... ) represents a radius of curvature of an ith lens surface from the object side, di (i=1,2,3, ... ) represents an ith axial distance from the object side (in this case, a condition before the lens G2 is decentered are shown), and Ni (i=1,2,3, ...) and vi (i=1,2,3, ... ) represent a refractive index and an Abbe number, to the d-line, of an ith lens from the object side, respectively. In the table, data on an aperture stop A (FIG. 7) arranged between a first lens unit L1 and a second lens unit L2 are omitted. fALL represents a focal length of the entire system and FNo. represents a minimum f-number. The surfaces marked with asterisks in the radius of curvature column are aspherical, and are defined by the following equation (7) which represents a surface configuration of an aspherical surface:

$$X = \frac{C_0 H^2}{1 + (1 - \epsilon C_0^2 \cdot H^2)^{\frac{1}{2}}} + \sum_{i=4}^{12} A_i H^i \quad (7)$$

where X represents a displacement amount from a reference surface along the optical axis, H represents a height in a direction vertical to the optical axis, ε represents a conic constant, $C_0$ represents a curvature (reciprocal number of radius of curvature) of a spherical surface which serves as a reference for the aspherical surface, and Ai represents an ith-order aspherical coefficient.

Figure 7:
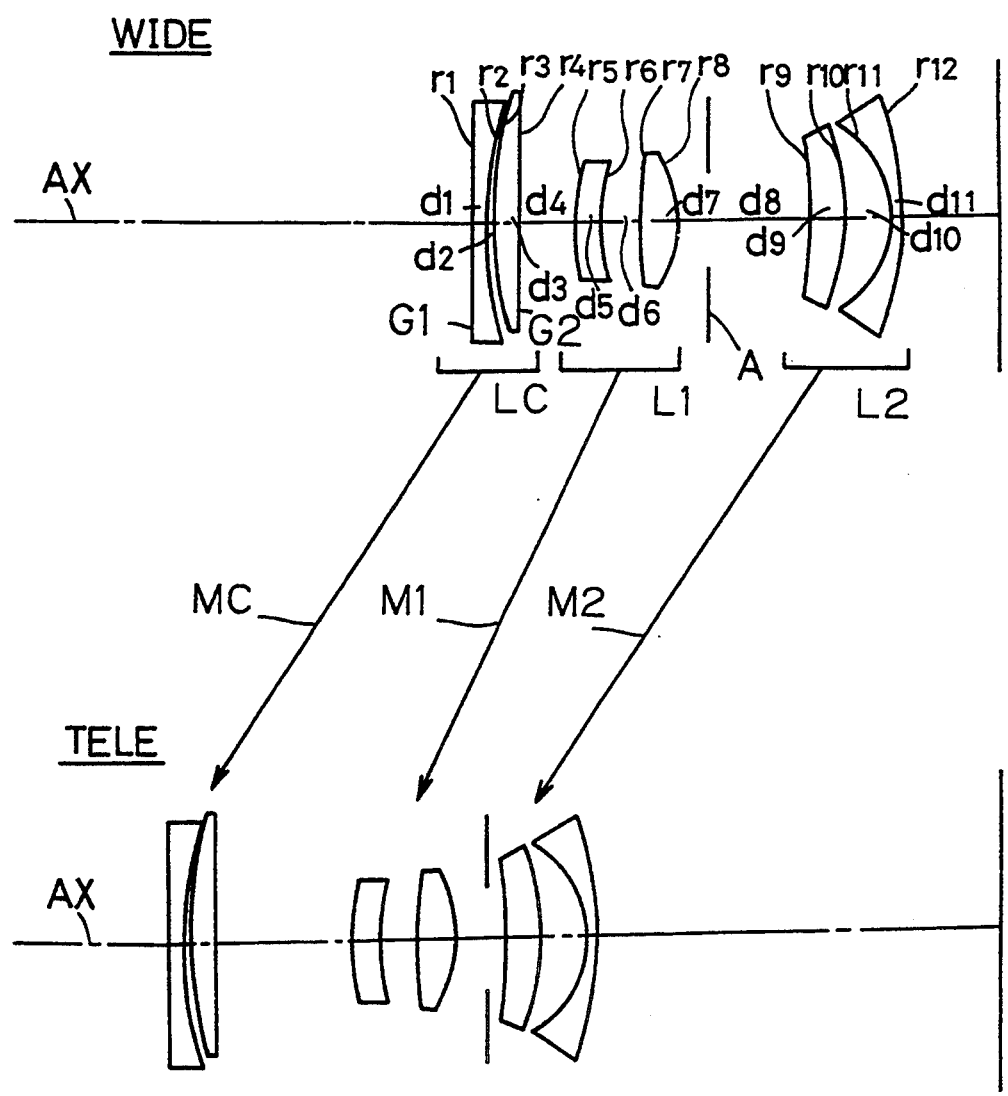
FIG. 7 shows lens arrangements of a taking optical system to which the first embodiment of the present invention is added at the shortest and longest focal length conditions, and lens movements from the shortest to the longest focal length conditions.

FIG. 7 shows lens arrangements and positions of the taking optical system to which the first embodiment of FIG. 6 is added at the shortest focal length condition (WIDE) and at the longest focal length condition (TELE) in correspondence with the numerical data shown in Table 1. As the lens arrangements of the convex lens G2 in the figure, the ones after the decentering are shown. The arrows MC, M1 and M2 in the figure schematically show movements of the camera shake compensating optical system LC of this embodiment and the first and the second lens units L1 and L2 of the taking optical system from the shortest focal length condition (WIDE) to the longest focal length condition (TELE), respectively.

The taking optical system embodying the present invention is a typical standard zoom lens system having a focal length range between approximately 35 mm and 77 mm. The taking optical system comprises from the object side a first lens unit L1 having a negative meniscus lens element concave to the image side and a positive bi-convex lens element, an aperture stop A, and a second lens unit L2 having a positive meniscus lens element convex to the image side and a negative meniscus lens element concave to the object side. Both side surfaces of the negative meniscus lens element concave to the image side and the image side surface of the positive bi-convex lens element of the first lens unit L1 and the object side surface of the positive meniscus lens element convex to the image side of the second lens unit L2 are aspherical. The first and second lens units L1 and L2 have a positive power and a negative power, respectively, and are moved toward the object side during zooming from the shorter focal length condition to the longer focal length condition. At that time, the movement amount of the second lens unit L2 is larger.

As shown in FIG. 7, the compensating optical system LC moves toward the object side together with the second lens unit L2 whose movement amount is larger. This is because the aberration deterioration due to the decentering for camera shake compensation is less remarkable when the compensating optical system LC is away from the taking optical system. In the zoom lens system, since the image deterioration due to the decentering of the compensating optical system LC is more remarkable at the longer focal length condition, the compensating optical system LC is preferably arranged so as to be away from the taking optical system at the longer focal length condition. Conversely, if the compensating optical system is arranged so as to be away from the taking optical system at the shorter focal length condition, since not only the total length of the optical system increases but also it is required to increases the effective aperture of the compensating lens because of the large angle of view of the wide angle lens, the lens to be decentered should be heavier, so that it becomes difficult to quickly decenter the lens. Therefore, in the zoom lens, it is preferable that the compensating and the taking optical systems of the present invention move during zooming so as to become close to each other at the shorter focal length condition and so as to be away from each other at the longer focal length condition.

Figure 9:
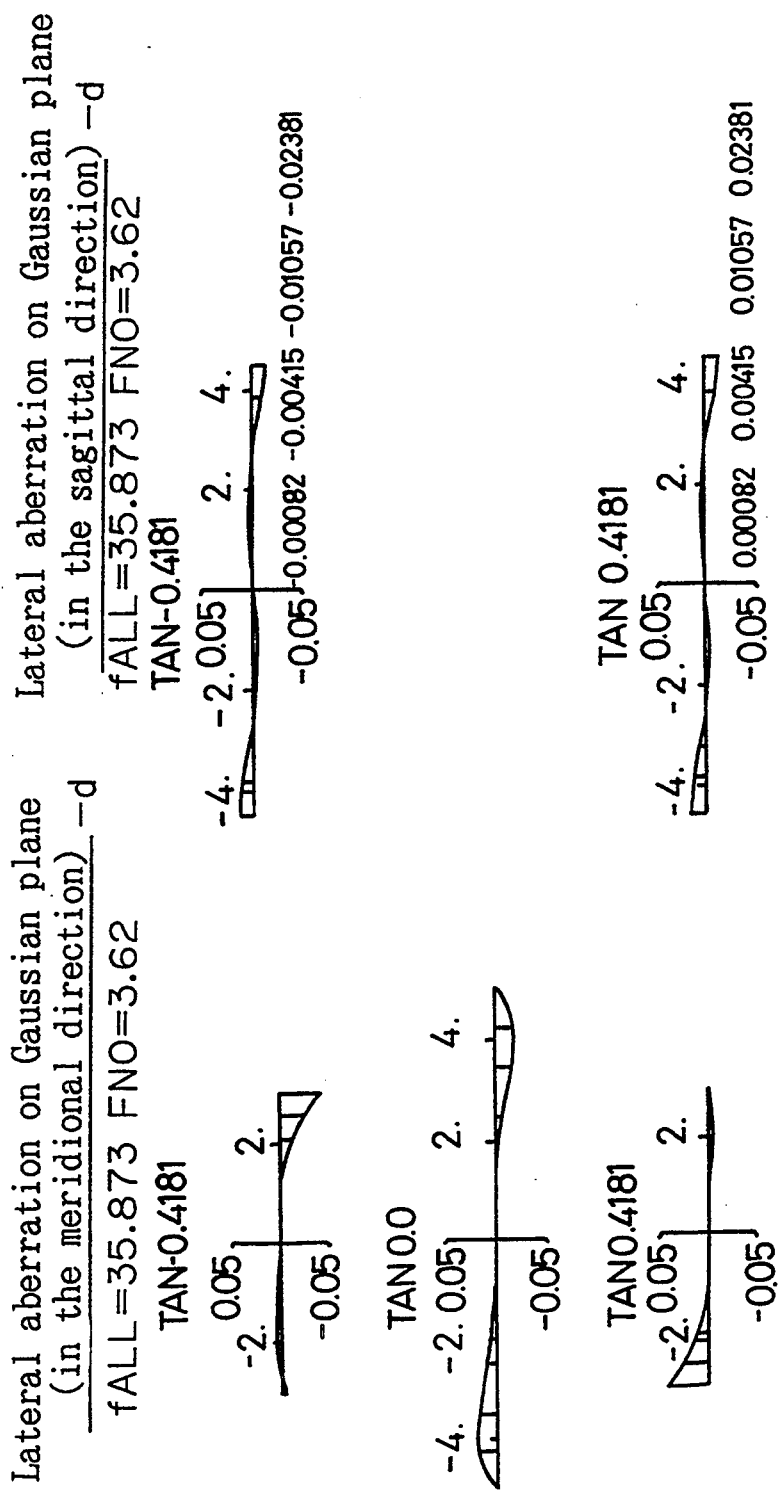
FIG. 9 shows lateral aberrations of the taking optical system to which the first embodiment of the present invention is added at the shortest focal length condition before the decentering of a lens G2.
Figure 10:
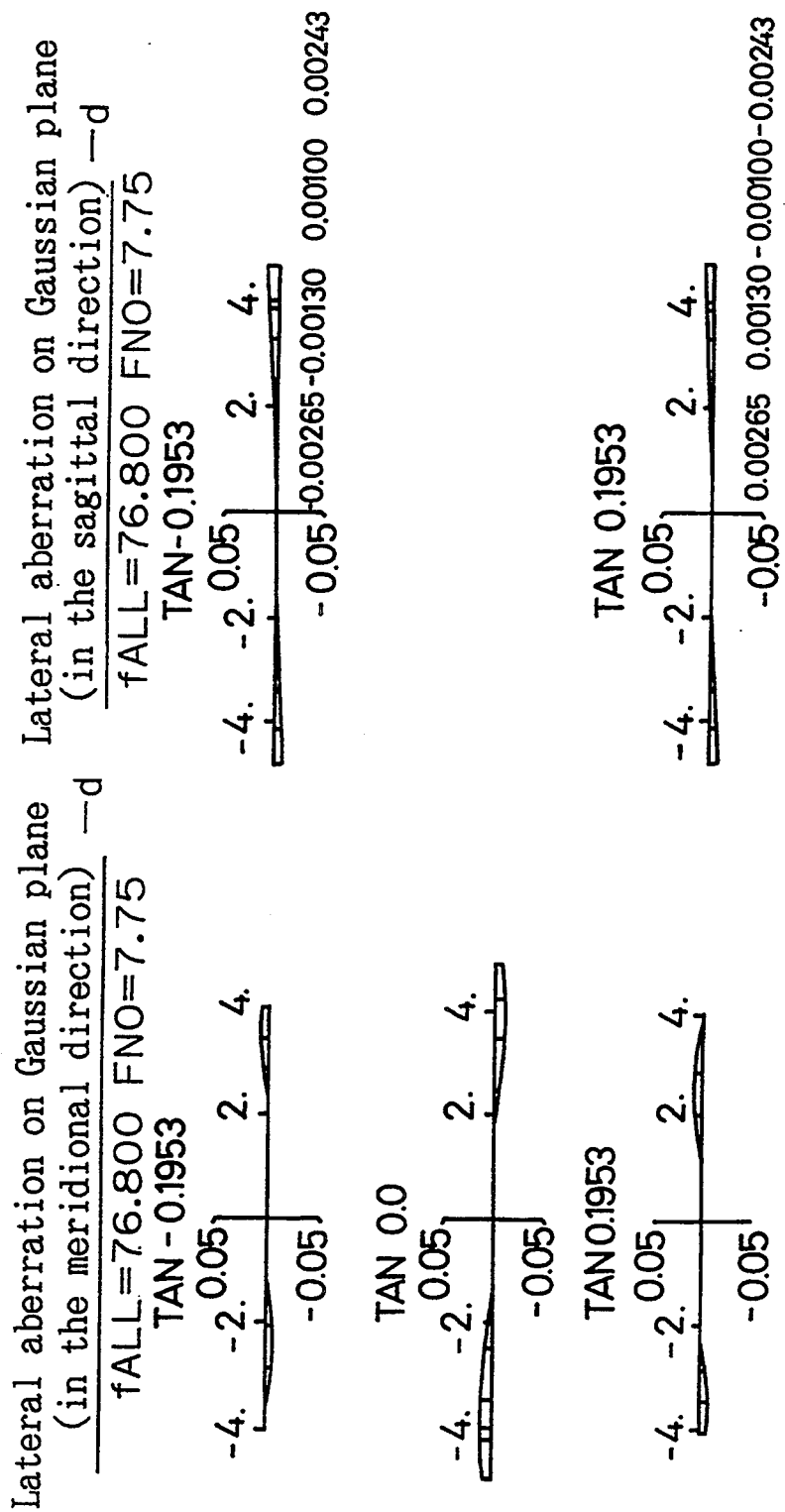
FIG. 10 shows lateral aberrations of the taking optical system to which the first embodiment of the present invention is added at the longest focal length condition before the decentering of the lens G2.

FIGS. 9 to 12 show aberrations of the taking optical system to which the first embodiment is added. FIGS. 9 and 10 show lateral aberrations (in the meridional and sagittal directions) on the Gaussian plane before the decentering at the shortest and longest focal length conditions. FIG. 11 and 12 show lateral aberrations (in the meridional and sagittal directions) on the Gaussian plane after the decentering at the shortest and longest focal length conditions.

In the first embodiment, even if the radius of curvature r2 of the spherical surface R2 and the radius of curvature r3 of the spherical surface R3 are the same, by making the surfaces R2 and R3 aspherical, it is possible to reduce the amount of over compensation of blur of the off-axial light beam while preventing the deterioration of aberration performance due to the decentering of the lens G2. FIGS. 13 and 14 show lateral aberrations (in the meridional and sagittal directions) on the Gaussian plane before the decentering of the lens G2 at the shortest and longest focal length conditions when the surfaces R2 and R3 are aspherical surfaces with $\epsilon=0.5$.

When aspherical surfaces are employed for the surfaces R2 and R3, the deterioration of aberration performance due to the decentering of the compensation lens G2 is approximately the same as that when aspherical surfaces are not employed therefor. However, the amount of blur caused by the over compensation of the off-axial light beam is 32 $\mu$m, which is smaller than 39 $\mu$m that is the amount of blur of the first embodiment employing spherical surfaces.

Numerical data of a second to a fourth embodiments are shown in Tables 2 to 4 similarly to the first embodiment. In the tables, the refractive power $\Phi$ and the angular magnification $\gamma$ are also shown.

Figure 15:
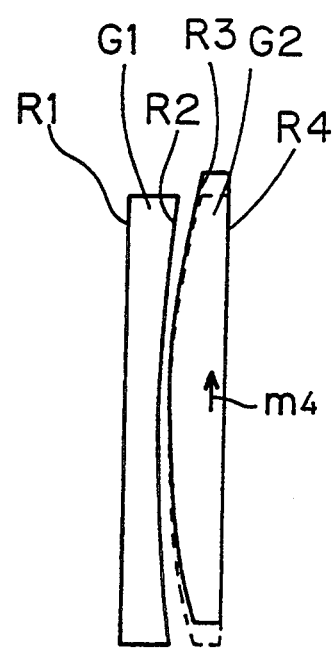
FIG. 15 shows a lens arrangement of a second embodiment of the present invention.

FIG. 15 shows a lens arrangement of the second embodiment of the present invention. Similarly to the first embodiment, the second embodiment can be used for a standard zoom lens system (f=approximately 28 to 80 mm). In the second embodiment, chromatic aberration has been corrected.

Specifically, the second embodiment has an arrangement similar to that of the first embodiment except that a lens G1 made of high-refractive index, low-dispersion glass (Nd=1.7725, vd=49.8) and a lens G2 made of low-refractive index, high-dispersion glass (Nd=1.6031, vd=60.7) are used. However, since the lens G1 and the lens G2 have different refractive indices, the radius of curvature of the surface R2 is larger than that of the surface R3 so that the sum of the powers of the surfaces R2 and R3 is approximately 0. When the lenses G1 and G2 having refractive indices and dispersion like the ones of the present embodiment are used, the radii of curvature of the surfaces R2 and R3 can be slightly different from each other. It is more advantageous if the previously-described conditions (1) and (2) are fulfilled. In FIG. 15, an arrow m4 represents a direction in which the compensating lens G2 is decentered.

Figure 16:
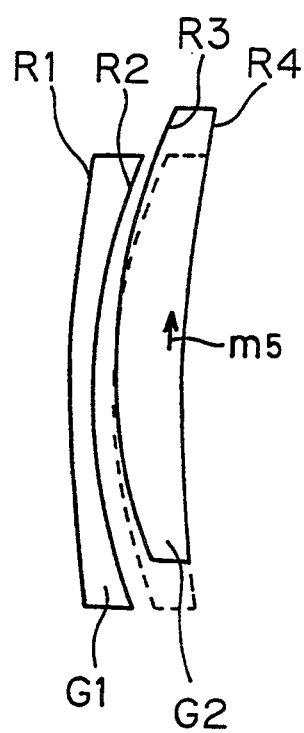
FIG. 16 shows a lens arrangement of a third embodiment of the present invention.

FIG. 16 shows a lens arrangement of the third embodiment of the present invention. The third embodiment is for use in a taking optical system having a shorter focal length (f=approximately 24 mm). When the taking optical system has a shorter focal length, if the radii of curvature of the facing surfaces R2 and R3 are reduced, the axial thickness of the compensating lens G2 increases. In order that the axial thickness of the compensating lens G2 is small even though the radii of curvature of the facing surfaces R2 and R3 are small, the compensating optical system is provided with a meniscus configuration nearly afocal as a whole. Even with such an arrangement, the angular magnification is merely slightly larger than 1. Since the driving for the camera shake compensation is performed by decentering the lens G2 along the surface R4 (in the direction of arrow m5), similarly to the first embodiment, even if the surface R4 is moved, the position of the surface R4 does not change optically. As a result, the luminous flux passing therethrough is not affected.

Figure 17:
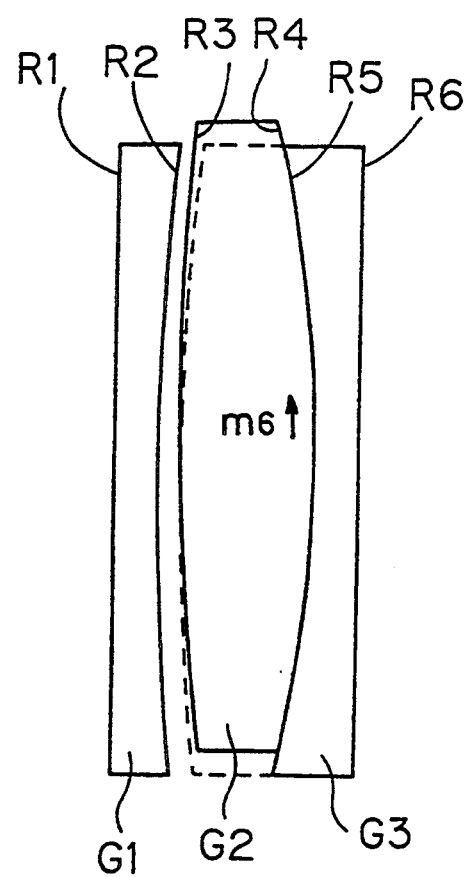
FIG. 17 shows a lens arrangement of a fourth embodiment of the present invention.

FIG. 17 shows a lens arrangement of the fourth embodiment of the present invention. The fourth embodiment is for use in a taking optical system having a longer focal length (f=approximately 135 mm). In this embodiment, instead of the lens G2 of the first embodiment (FIG. 8), two lenses G2 and G3 attached to each other are used. A surface R6 corresponds to the surface R4 of the first embodiment, and is not moved by the camera shake compensation driving. Since the surfaces R4 and R5 are always attached to each other, they have no power optically. When the lens G2 is decentered (in the direction of arrow m6) while the surfaces R4 and R5 being attached to each other, since the surface R3 is provided with inclination, the surface R3 has a working similar to that of the surface R3 of the first embodiment.

When the radius of curvature of the surface R3 is large like in the fourth embodiment, in order to incline the surface R3 with respect to the surface R2 to compensate for camera shake by the decentering as shown in FIG. 8, the decentering amount should be large. If the decentering amount is large, the size of the decentering lens should be large. To prevent this, the two lenses G2 and G3 attached to each other are used in this arrangement. Therefore, this embodiment is advantageous for use in the taking optical system having a longer focal length. In a type where parallel decentering is performed like the first embodiment, it is required to move the lens by 2 mm or more for a camera shake of 1°. In this embodiment, however, the lens movement amount is the half or less than the half thereof.

While in the above-described embodiments, camera shake is compensated for by moving only one lens, the compensation may be made, for example, by a relative displacement where two lenses moves in opposite directions, respectively. Moreover, since camera shake can occur in any of the upper, lower, left and right directions, each of lenses may be designed so that only a camera shake in a predetermined direction allotted thereto is compensated for.

Values of the above-described first to fourth embodiments for the conditions (1), (2) and (3) are shown in Table 9. Values of the first to fourth embodiments for the condition (6) are shown in Table 10.

Figure 18:
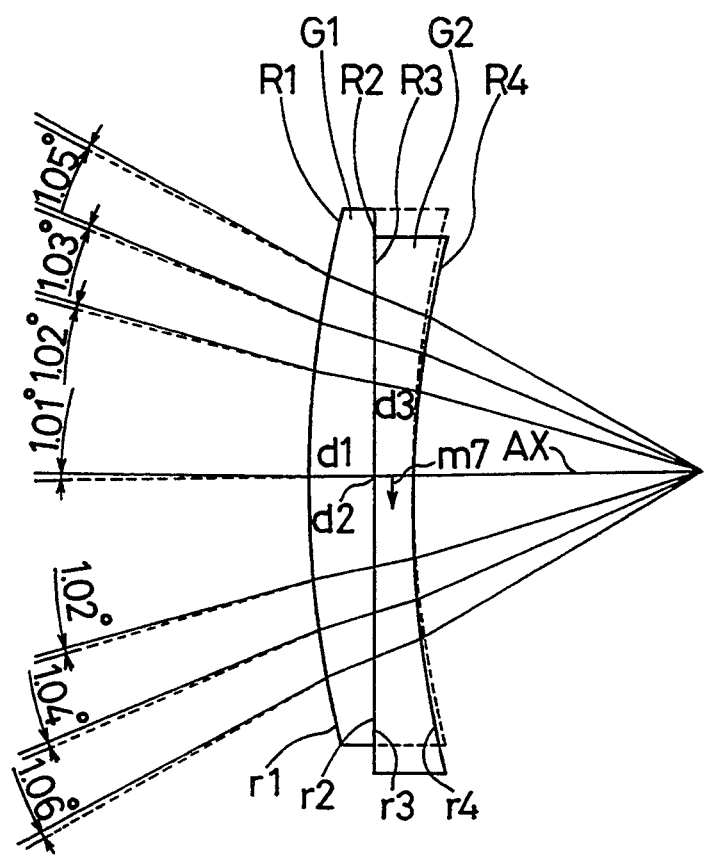
FIG. 18 shows a lens arrangement and optical paths of a fifth embodiment of the present invention.

Subsequently, a fifth embodiment of the present invention will be described. FIG. 18 cross-sectionally shows a lens arrangement of this embodiment. A compensating optical system of this embodiment comprises a first lens G1 convex to the object side (plano-convex lens whose object side surface is R1 and whose image side surface is R2) and a second lens G2 concave to the image side (plano-concave lens whose object side surface is R3 and whose image side surface is R4). These two lenses are attached to each other. The compensating optical system is substantially afocal as a whole. Numerical data of this embodiment are shown in Table 5 similarly to the first embodiment.

The feature of this embodiment lies in that the most image side surface R4 is convex to the object side and in compensating for blur of a taken image, the surface R4 is displaced so as to incline with respect to the optical axis AX of the taking optical system. As shown in FIG. 18, when the second lens G2 is displaced in a direction (arrow m7) vertical to the optical axis AX, the surface R4 inclines with respect to the optical axis AX. By deflecting the transmitted light beam by the relative displacement, blur of a taken image can be compensated for similarly to the first embodiment. In FIG. 18, the broken line represents the position of the second lens G2 before the decentering.

As previously explained, the reason why the off-axial light beam is bent by as much as 1.27° at the most to be over-compensated for in the variable vertical angle prism of FIG. 4 (third prior art) is that although the angle of incidence of the axial light beam on the prism is approximately 0°, the angle of incidence of the off-axial light beam on the prism is large.

On the contrary, in this embodiment, as shown in FIG. 18, the angles of incidence and exit of the off-axial light beam on and from the compensating optical system are remarkably small compared to the angles of incidence and exit thereof on and from the variable vertical angle prism shown in FIG. 4. That is, the difference between the compensation angle of the off-axial light beam and that of the axial light beam is 0.05°, from which it is found that the amount of over compensation is restrained to an extremely small amount. This results from the fact that although the plain surface R4 is displaced in the third prior art, the surface R4 which is convex to the object side is displaced so as to incline with respect to the optical axis AX in this embodiment.

Moreover, as previously described, when the variable vertical angle prism (FIG. 4) is added to a taking optical system with a focal length of 35 mm and an image height of 15 mm, the amount of blur caused by the over compensation of the off-axial light beam is as much as 106 µm. In this embodiment, however, it is 30 µm or less.

Moreover, since the most object side surface R1 of the first lens G1 also is convex to the object side, a similar advantage will be obtained if the surface R1 is displaced so as to incline with respect to the optical axis AX of the taking optical system or if the surfaces R1 and R4 are displaced in directions different from each other.

Subsequently, optical performance when this embodiment is added to a zoom lens system will be described. FIG. 19 shows lens arrangements and positions of a typical zoom lens system at the shortest focal length condition <W>, at the middle focal length condition <M> and at the longest focal length condition <T> before the compensating optical system is added thereto. At the shortest focal length condition, the focal length is 36 mm and the f-number is 4.1, while at the longest focal length condition, the focal length is 102 mm and the f-number is 7.9. This zoom lens system comprises from the object side a first lens unit L1 having a positive power, a second lens unit L2 having a positive power and a third lens unit L3 having a negative power. Numerical data thereof are shown in Table 6.

If the surface R4 having a curvature inclines with respect to the optical axis of the taking optical system in compensating for camera shake as described above, there is a possibility that aberrations deteriorate. For example, considering a case where this embodiment is added to a zoom lens system as shown in FIG. 19, although optical performance is excellently maintained at the shortest focal length condition since the amount of over compensation of the off-axial light beam is small, at the longest focal length condition, there is a possibility that aberration deterioration rather than over compensation of the off-axial light beam becomes a problem.

Figure 20:
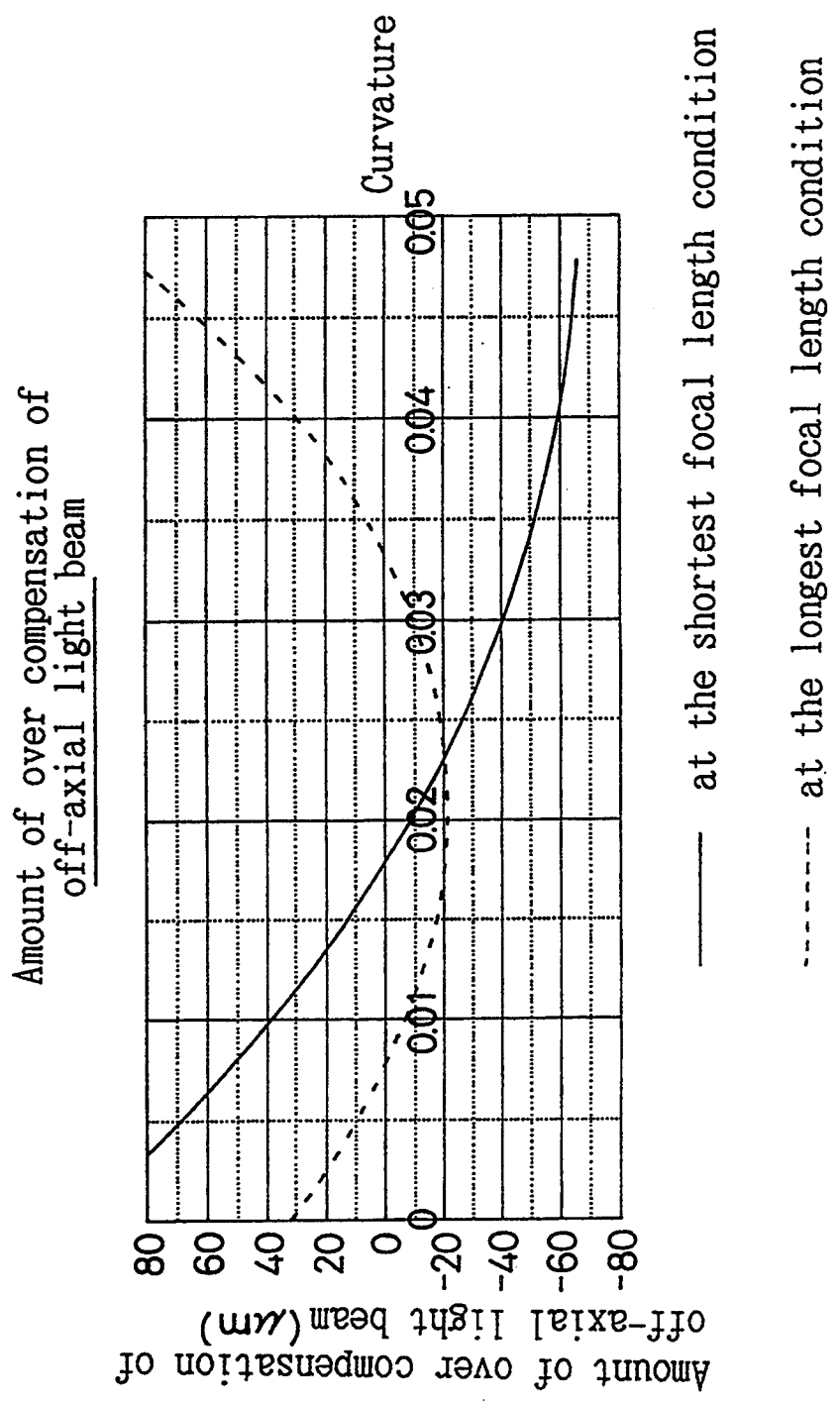
FIG. 20 shows the amounts of the over compensation of the off-axial light beam when the most image side surface is displaced so as to incline with respect to the optical axis in the taking optical system to which the fifth embodiment of the present invention is added.
Figure 21:
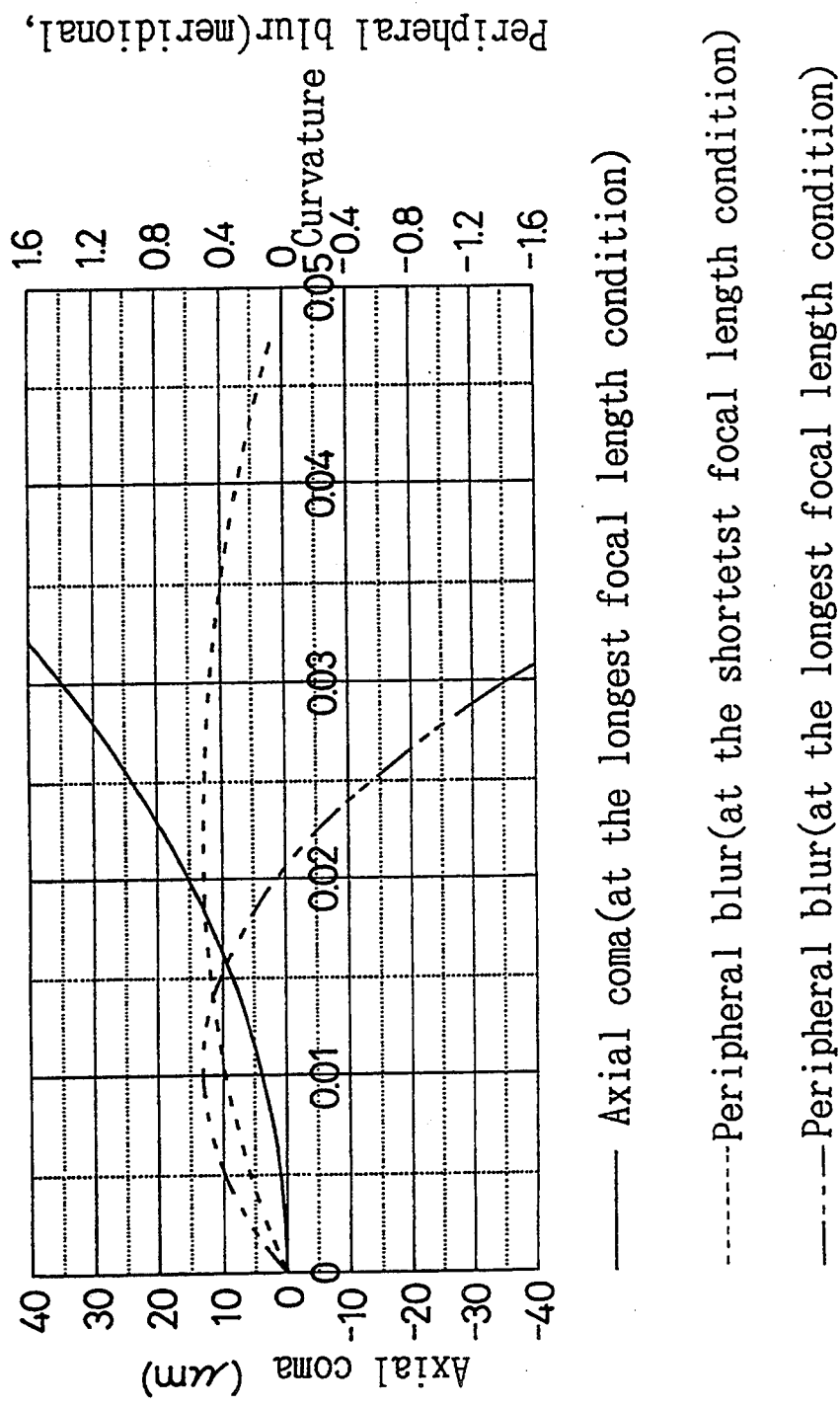
FIG. 21 shows the amount of the aberration deterioration at the time of camera shake compensation when the most image side surface is displaced so as to incline with respect to the optical axis in the taking optical system to which the fifth embodiment of the present invention is added.

FIGS. 20 and 21 show approximate calculation results of the over compensation amount and the aberration deterioration amount (change of the sizes of axial coma and peripheral blur [a condition where, while the central portion is in focus, the peripheral portion is out of focus]) of the off-axial light beam when the curvature ($=1/r4$, where r4 represents a radius of curvature of the surface R4) of the most image side surface R4 of the compensating optical system is changed by displacing the surface R4 so as to incline with respect to the optical axis AX. In this case, the amount of compensation by the compensating optical system is set so that the compensation angle of the axial light beam is always 1° regardless of the curvature.

Figure 22:
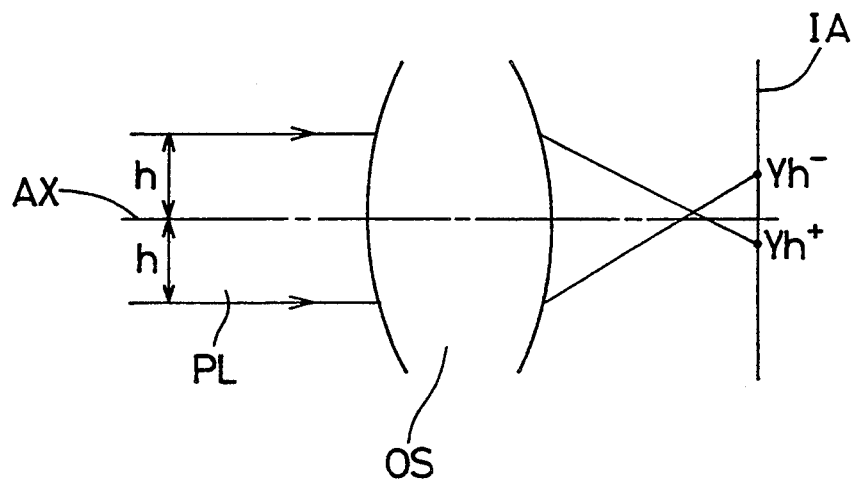
FIG. 22 is a view for explaining axial coma in FIG. 21.

The above-mentioned axial coma will be explained with reference to FIG. 22. Points at which parallel incident light beams PL away from the optical axis AX by a height h upwardly and downwardly, respectively, intersect with a paraxial image plane IA through an optical system OS are denoted by $Yh^+$ and $Yh^-$, respectively. Although $Yh^+ = -Yh^-$ when the optical system OS is rotation-symmetrical with respect to the optical axis AX, $Yh^+ \neq -Yh^-$ when the rotation symmetry is broken. For this reason, in the embodiments of the present invention, axial coma is defined as $(Yh^+ + Yh^-)/2$ with respect to a height h which is 70% of the height h obtained at open aperture.

Figure 23:
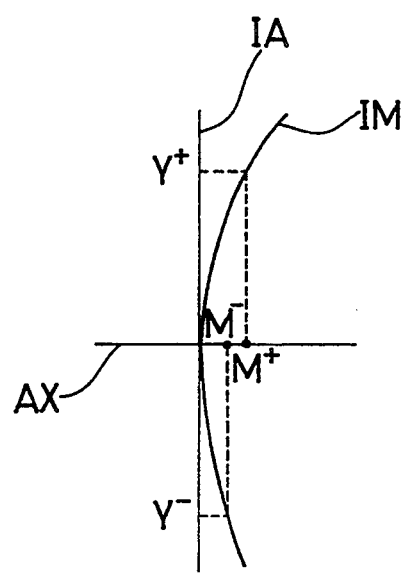
FIG. 23 is a view for explaining peripheral blur in FIG. 21.

Subsequently, the above-mentioned peripheral blur will be explained with reference to FIG. 23. Although a meridional image surface IM of an optical system of rotation symmetry is vertically symmetrical with respect to the optical axis AX, it becomes asymmetrical when the rotation symmetry breaks. When the meridional image points of $Y^+$ and $Y^-$ having the same absolute value of the image height and different signs are denoted by $M^+$ and $M^-$, $M^+ - M^-$ are defined as meridional peripheral blur. Sagittal peripheral blur is defined in the same manner.

In FIGS. 20 and 21, the condition where the curvature is 0 is equal to the case where the variable vertical angle prism shown in the third prior art is used. In FIG. 20, that the over compensation amount is negative shows that the off-axial light beam is under-compensated for compared to the axial light beam.

While in FIGS. 20 and 21, the over compensation amount and the aberration deterioration amount of the off-axial light beam when the surface R4 is displaced are shown, a similar result can be obtained when the surface R1 is displaced. Hereinafter, the curvature of a surface to be displaced as described above will be denoted by C, the curvature of the surface R1 will be denoted by C1, and the curvature of the surface R4 will be denoted by C4.

As shown in FIG. 20, in a region where the curvature C is small (in this case, C<0.03), the over compensation amount of the off-axial light beam is larger at the shorter focal length condition than at the longer focal length condition. Considering the final performance of an image, it is required that the over compensation amount of the off-axial light beam is 45 μm or less, 60 μm or less at the worst. According to FIG. 20, the curvature C corresponding to 45 μm or less is 0.08≦C. To standardized this, since the shortest focal length F1w of the taking optical system is 36, from 0.008×36=0.29, the following condition (8) is obtained:

$$0.29 \leq F1w \times C \tag{8}$$

Similarly, under a condition where the over compensation amount is 60 μm or less (0.006≦C corresponds thereto), from 0.006×36=0.22, the following condition (9) is obtained:

$$0.22 \leq F1w \times C \tag{9}$$

In a region where the curvature C is large (in this case, C≧0.03), necessary conditions are obtained from the aberration deterioration amount shown in FIG. 21. This will be explained. In the aberration deterioration shown in FIG. 21, it is found that the aberration deterioration is more remarkable at the longest focal length condition than at the shortest focal length condition. Axial coma at the shorter focal length condition, which is small, is omitted in the figure.

In order to restrain the performance deterioration of an image due to aberration deterioration, it is required that axial coma is within 30 μm. Moreover, since the minimum f-number is 7.9, it is required that the peripheral blur is within 1.6 mm which is approximately one-fifth of the f-number. It is found from FIG. 21 that in order to fulfill these conditions, C≦0.028 should be fulfilled. To standardize this by the longest focal length F1t=102 of the taking optical system, from 0.028×102=2.86, the following condition (10) is obtained:

$$F1t \times C \leq 2.86 \tag{10}$$

When the compensating optical system is arranged in front of the taking optical system where the focal point can be varied and the shortest and longest focal lengths of the taking optical system are denoted by F1w and F1t, respectively, the curvature C of a surface to be inclined with respect to the optical axis of the taking optical system preferably fulfills the above-mentioned conditions (9) and (10).

Numerical data of a taking optical system (FIG. 19) to which a sixth embodiment of the present invention which fulfills the conditions (8) to (10) is added are shown in Table 6 similarly to the previously-described first embodiment.

Figure 24:
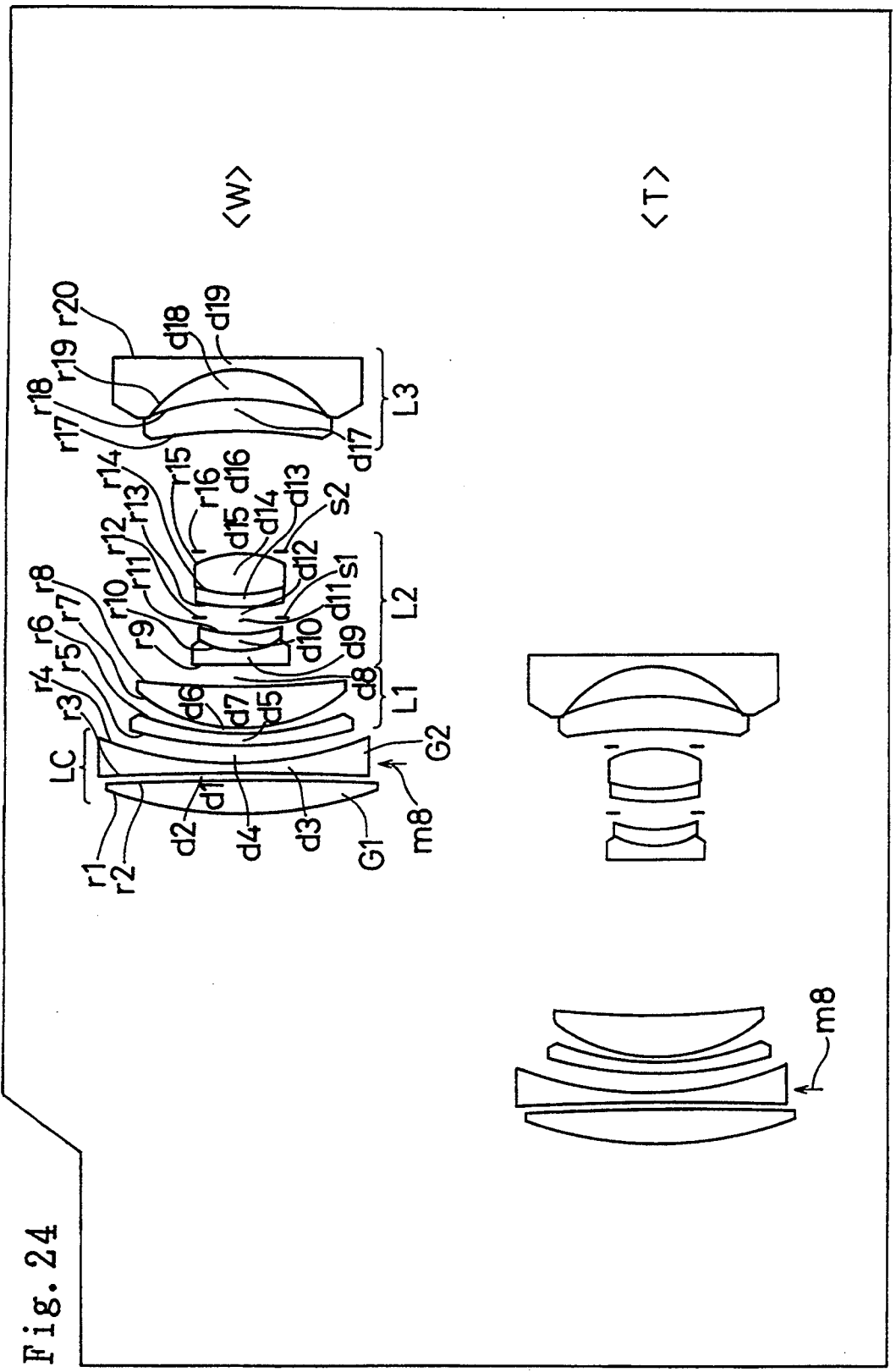
FIG. 24 shows lens arrangements of a taking optical system to which a sixth embodiment of the present invention is added at the shortest and longest focal length conditions.

FIG. 24 shows lens arrangements and positions of the taking optical system (FIG. 19) to which the sixth embodiment is added at the shortest focal length condition <W> and at the longest focal length condition <T> in correspondence with the numerical data of Table 6. As the lens arrangements of the lens G2 in the figure, the ones after the decentering, that is, the ones after the second lens G2 is moved in the direction of arrow m8 (in a direction vertical to the optical axis AX) are shown. Since the second lens G2 is a negative lens, when it is upwardly moved as shown in FIG. 24, the compensating optical system bends a luminous flux from an object in a clockwise direction. Since this embodiment is a compensating optical system of a front converter type as shown in FIG. 24, image blur can excellently be compensated for regardless of the focal length of the taking optical system.

This embodiment comprises from the object side a positive bi-convex lens G1 and a negative bi-concave lens G2. That is, both of the most object side surface and the most image side surface are convex to the object side.

As previously described, the taking optical system comprises the first lens unit L1, the second lens unit L2 and the third lens unit L3 (FIG. 19). The first lens unit L1 comprises a negative meniscus lens element concave to the image side and a positive meniscus lens element convex to the object side. The second lens unit L2 comprises a doublet lens element consisting of a negative meniscus lens element L21 concave to the image side and a positive meniscus lens element L22 convex to the object side, a light restricting plate S1, a doublet lens element consisting of a negative meniscus lens element L23 concave to the image side and a positive bi-convex lens element L24, and an aperture stop S2. The third lens unit L3 comprises a positive meniscus lens element convex to the image side and a negative meniscus lens element concave to the object side.

The image side surface of the negative meniscus lens element of the first lens unit L1, the object side surface of the negative meniscus lens element L21 and the image side surface of the positive meniscus lens element L22 and the image side surface of the positive bi-convex lens element L24 of the second lens unit L2, and the object side surface of each lens element of the third lens unit L3 are aspherical. Zooming is performed by moving each lens unit as shown in the figure.

In the previously-described fifth embodiment (FIG. 18), the first lens G1 and the second lens G2 are closely attached to each other. Considering actually decentering the first lens G1 or the second lens G2, however, it is preferable to provide a slight space between the first lens G1 and the second lens G2 like the sixth embodiment. This is because it is not easy to drive the lenses if there is no space therebetween and also because in the sixth embodiment, the facing surfaces R2 and R3 of the lenses G1 and G2 are provided with a slight curvature for aberration correction.

FIGS. 25 and 26 show lateral aberrations of the taking optical system to which the sixth embodiment is added before the second lens G2 is displaced (that is, before the decentering). FIG. 27 and 28 show lateral aberrations of the taking optical system to which the sixth embodiment is added when the second lens G2 is displaced in a direction vertical to the optical axis (in the direction of arrow m8 in FIG. 24) (that is, after the decentering). FIGS. 25 and 27 show the lateral aberrations at the shortest focal length condition, while FIGS. 26 and 28 show the lateral aberrations at the longest focal length condition. In FIGS. 27 and 28, the displacement amount of the second lens G2 is 0.97 mm and the compensation angle of the off-axial light beam is 0.7°. As is understood from FIGS. 25 to 28, by using the camera shake compensating optical system of this embodiment, aberrations can excellently be corrected even in a 3x zoom lens system.

While in the sixth embodiment, the second lens G2 of the compensating optical system LC is displaced as shown in FIG. 24, a similar performance is also obtained by displacing the first lens G1 even if the most object side surface R1 inclines with respect to the optical axis AX of the taking optical system. However, since, opposite to the second lens G2, the first lens G1 is a positive lens, when it is decentered upwardly in the figure, a luminous flux from an object is bent in a clockwise direction. Since the compensating optical system LC is afocal as a whole, the curvature C1 of the object side surface of the first lens G1 and the curvature C4 of the image side surface R4 of the second lens G2 are approximately the same. Even if the curvatures C1 and C4 are different from each other, the over compensation amount and the aberration deterioration amount for the curvatures of the off-axial light beam are the same in the case where the object side surface R1 is displaced as previously mentioned. Therefore, in the case where the object side surface R1 of the first lens G1 is displaced, the curvature of the surface R1 preferably fulfills the conditions (8) (preferably also (9)) and (10).

Since the actual camera shake occurs not only in one direction but also in the upper, lower, left and right directions, that is, two-dimensionally, it is necessary to move the compensating optical system two-dimensionally. Moving one lens two-dimensionally not only requires a complicated driving apparatus but also deteriorates driving accuracy. In the sixth embodiment, however, since compensation can excellently be made by moving any of the first and second lenses G1 and G2 of the compensating optical system, by moving the first lens G1 and the second lens G2 in one different directions, respectively, the two-dimensional camera shake can be compensated for with a simple driving apparatus. In this case, since a lens to be driven in a vertical direction is more largely influenced by the gravity than a lens to be driven in a horizontal direction, a larger electric power is required to drive the lens to be driven in a vertical direction. In order to reduce the electric power required for the driving, it is preferable to move the first lens G1 (convex lens) which is lighter in a vertical direction and to move the second lens G2 (concave lens) which is heavier in a horizontal direction. In the case where the first lens G1 is displaced, it is preferable to arrange a protecting glass on the object side of the first lens G1 to prevent the user from inadvertently touching the first lens G1.

Subsequently, a camera shake detecting system will be described. In the embodiments of the present invention, by using a camera shake detecting system for separately measuring a camera shake amount, a camera shake compensating system can be constituted for driving the compensating lens in accordance with a camera shake amount successively outputted from the camera shake detecting system.

As a method for the camera shake detecting system, the following can be employed: a method in which an angle of shake of a camera is calculated from an output of an acceleration sensor or an angular velocity sensor provided in the lens barrel or the camera body; and a method in which a displacement of an object image is detected by an image sensor such as a charge coupled device (CCD). As the latter method, an external light passive method is preferable in which a specifically used image forming optical system is provided separately from the taking optical system. With the external light passive method, since no restriction is imposed on the taking optical system unlike a through the lens (TTL) method, a compact optical system can be realized.

Moreover, as previously described, in the system of Japanese Laid-open Patent Application No. H1-116619 where the second and third lens units are decentered, it is necessary to change the displacement amounts of the decentered lens units for camera shake compensation when the focal length of the zoom lens is changed. Therefore, in order to calculate the displacement amounts of the decentered lens units, highly accurate information is required on the camera shake angle from the camera shake detecting system and the focal length of the zoom lens. Since a remarkably complicated adjustment is required considering nonuniformity of each part as a result, the system of the above prior art is unsuitable for mass production. On the contrary, in the embodiments of the present invention, since in the entire optical system including the compensating optical system, the compensating optical system is included in the most object side lens unit which moves during zooming, camera shake can be compensated for with a high accuracy regardless of the focal length of the zoom lens.

Numerical data of a seventh embodiment are shown in Table 7 similarly to the first embodiment. Numerical data of the surface R5 and succeeding surfaces of the zoom lens system are omitted since they are the same as those of the sixth embodiment.

Figure 29:
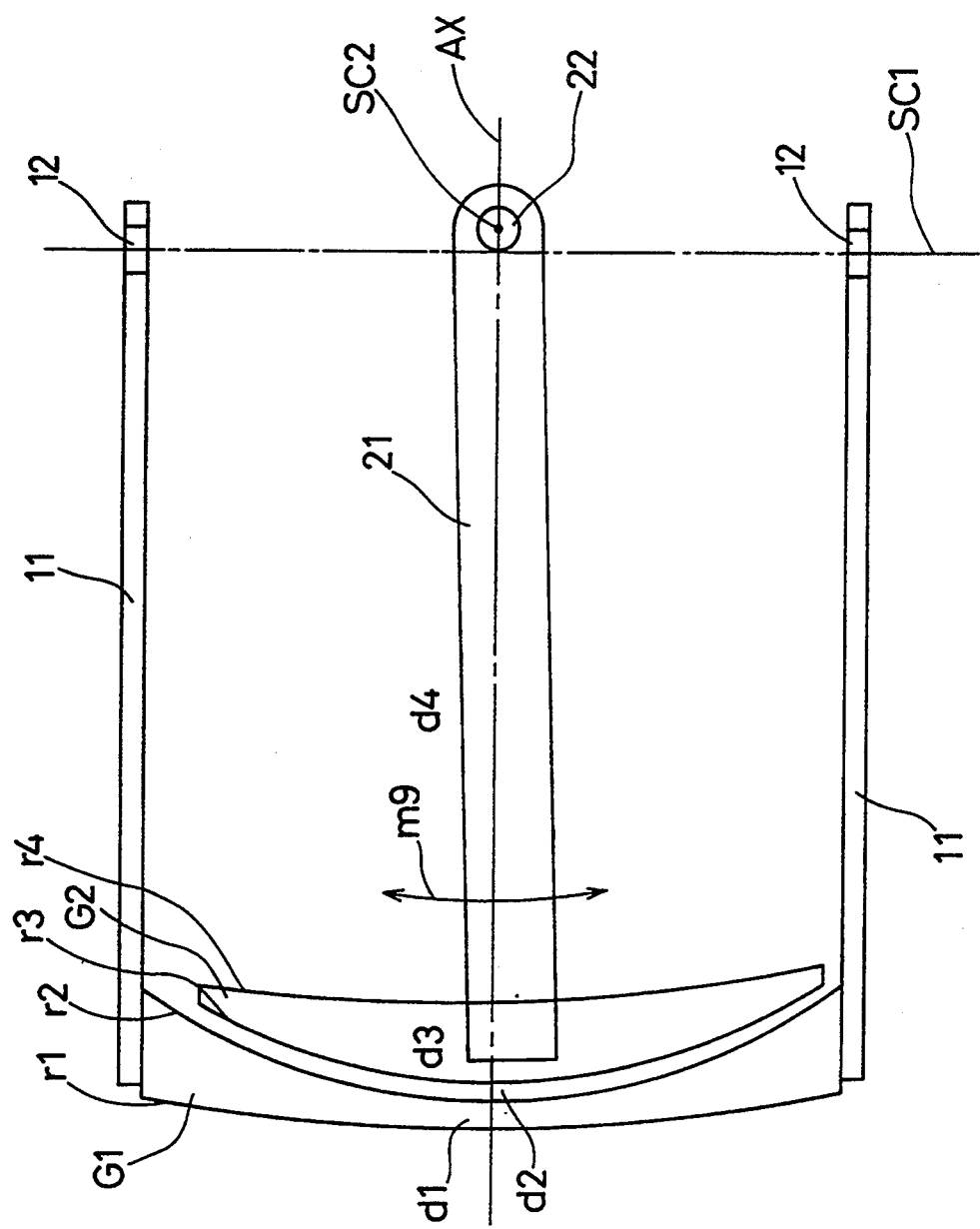
FIG. 29 is a cross-sectional view of a seventh embodiment of the present invention and a driving mechanism for driving it.

FIG. 29 shows a lens arrangement of the seventh embodiment in correspondence with the numerical data of Table 7. This embodiment comprises from the object side a negative meniscus lens G1 concave to the image side and a positive lens G2 convex to the object side. Similarly to the other embodiments, the most object side surface and the most image side surface are convex to the object side.

As shown in the figure, supporting members 11 and 12 for lens driving are provided to the first lens G1 and the second lens G2, respectively, so as to nip the lenses. An axis (not shown) is attached through holes 12 and 22 so that the lenses rotate. Similarly to the sixth embodiment, for slight aberration correction, the curvature of the surface R2 and the curvature of the surface R3 are not completely the same, and the centers of rotation SC1 and SC2 of the first and second lenses G1 and G2 are situated at positions slightly deviating from the centers of curvature of the surfaces R2 and R3 as shown in the figure.

As described above, the feature of this embodiment lies in that the first lens G1 having a negative power and the second lens G2 having a positive power are provided and that the first lens G1 is displaced in a direction approximately vertical to the optical axis AX of the taking optical system and the second lens G2 is displaced in a direction approximately vertical to the optical axis AX of the taking optical system and approximately vertical to the direction in which the first lens G1 is displaced. In this case, displacing in an approximately vertical direction represents rotating about the center of rotation (that is, rotational decentering). The center of rotation is a predetermined distance away from the spherical center of a surface to be displaced.

Figure 30:
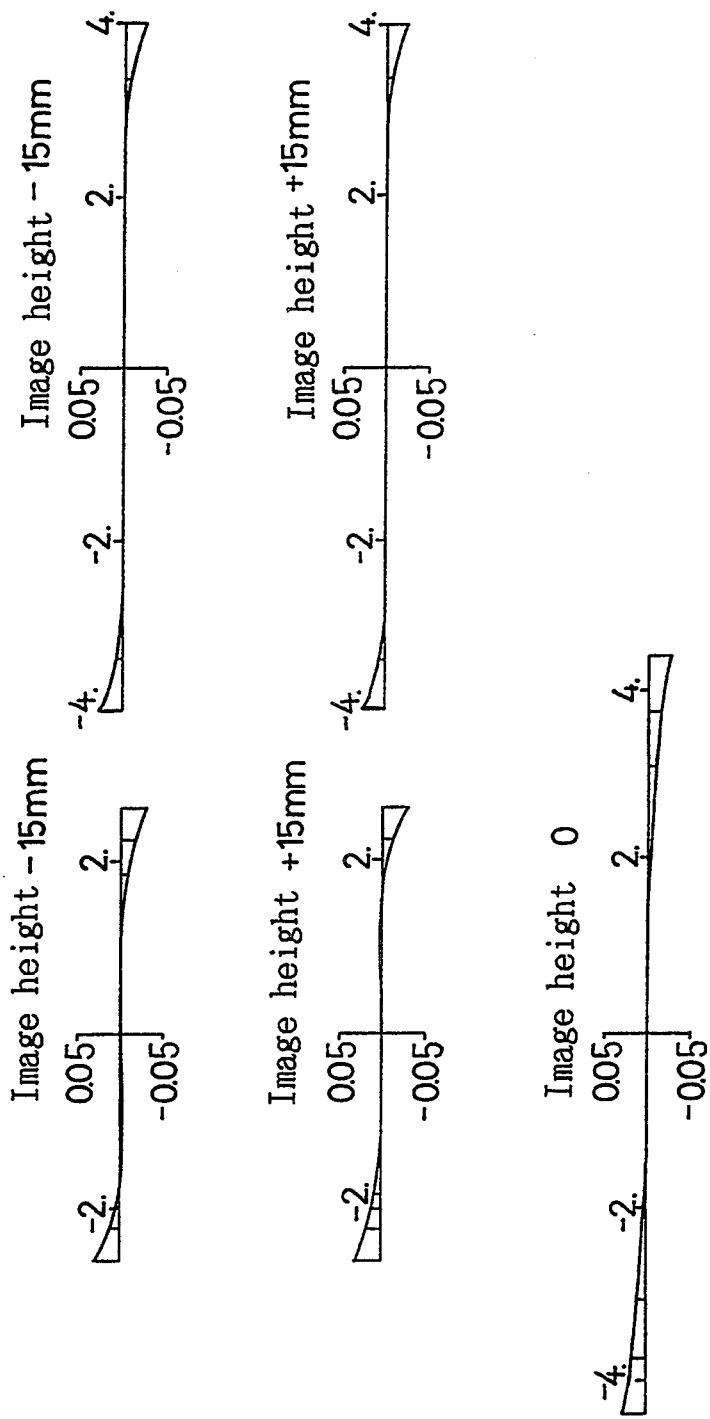
FIG. 30 shows lateral aberrations of a taking optical system to which the seventh embodiment of the present invention is added at the shortest focal length condition before the decentering of a lens G2.

FIGS. 30 and 31 show lateral aberrations of the taking optical system (FIG. 19) to which the seventh embodiment is added before the second lens G2 is displaced (that is, before the rotational decentering). FIGS. 32 and 33 show lateral aberrations of the taking optical system (FIG. 19) to which the seventh embodiment is added under a condition where the second lens G2 has been displaced (in the direction of arrow m9 of FIG. 29) about the center of rotational decentering (that is, after the rotational decentering). FIGS. 30 and 32 show the lateral aberrations at the shortest focal length condition. FIGS. 31 and 33 show the lateral aberrations at the longest focal length condition. Similarly to the sixth embodiment, the angle of compensation of the off-axial light beam is 0.7°.

The curvature C4 of the surface R4 to be displaced in the sixth embodiment is rather large as the surface which fulfills the conditions (8) to (10). On the contrary, the seventh embodiment is an example of the ones having a rather small curvature C (=0.012). If the curvature C is small, in an optical system having a plano-convex lens and a plano-concave lens like that of the sixth embodiment, since the power of each lens is weak, the decentering amount should be large if a compensation method is used in which the compensating lens is moved in a direction vertical to the optical axis AX. As a result, the size of the entire optical system will increase.

To solve such a problem, in the seventh embodiment, as shown in FIG. 29, the first lens G1 is a concave meniscus lens, the second lens G2 is a convex meniscus lens, the radii of curvature r2 and r3 of the facing surfaces of the first and second lenses G1 and G2 are approximately the same, and compensation is made by rotating about a position close to the center of curvature of r2 or r3. Since the radii of curvature r2 and r3 are approximately the same and rotation is made with the centers of curvature thereof as the centers of rotation SC1 and SC2, the surfaces R2 and R3 hardly change optically due to the rotation. When the first lens G1 is rotated, the object side surface R1 of the first lens G1 inclines with respect to the optical axis AX of the taking optical system. When the second lens G2 is rotated, the image side surface R4 of the second lens G2 inclines with respect to the optical axis AX of the taking optical system.

Since the absolute values of the powers of the first and second lenses G1 and G2 are approximately 0.013, the decentering amount required to displace the off-axial light beam by 0.7° is slightly less than 1 mm which is approximately the same as in the sixth embodiment. On the other hand, in a camera using the embodiments of the present invention, in order to enable photographing with an exposure time up to approximately 1 second, it is required to consider an inclination of the camera up to approximately 1.5° due to camera shake by the user.

A rough decentering amount can be obtained by the following equation (Fr1):

$$\delta = F1 \times \tan\alpha \quad (Fr1)$$

where $\alpha$ represents an angle of camera shake, F1 represents a focal length of the compensating lens to be decentered for camera shake compensation, and $\delta$ represents an amount of decentering from the optical axis of the taking optical system.

For example, in order to obtain $|\delta| \leq 3$ mm when $\alpha = 1.5°$, it is required to fulfill the following equation (Fr2):

$$|F1| \leq 114.6 \text{ mm} \quad (Fr2)$$

When the power of the lens to be decentered for camera shake compensation is denoted by $\Phi a$, $F1 = 1/\Phi a$. Therefore, in order to restrain the decentering amount of the lens from exceeding 3 mm in making a compensation of $\alpha = 1.5°$ as described above, it is required that the absolute value of the lens power $\Phi a$ of the lens to be decentered is 0.0087 or more. Therefore, it is preferable that the lens to be decentered fulfills the following condition (11):

$$|\Phi a| \geq 0.0087 \quad (11)$$

Subsequently, chromatic aberration at the time of the decentering of the lens in the compensation will be described. When camera shake occurs, the lens is decentered so as to compensate for a shift of the image point, and compensation is made so that the image point never shifts with respect to an axial incident luminous flux of a reference wavelength (d-line [588 nm] in the case of the seventh embodiment). At this time, since the displacement amount of the image point for the decentering amount of the lens differs between the luminous flux of the reference wavelength and a luminous flux of another wavelength, the image point shifts depending on the wavelength on the axial light beam, so that lateral chromatic aberration is generated. When the compensating lens to be decentered for the compensation is a single lens, lateral aberration of g-line (436 nm) to the d-line (this lateral aberration will hereinafter be referred to as axial lateral chromatic aberration) depends not on the curvature of the compensating lens but on the Abbe number vd of the compensating lens.

Figure 34:
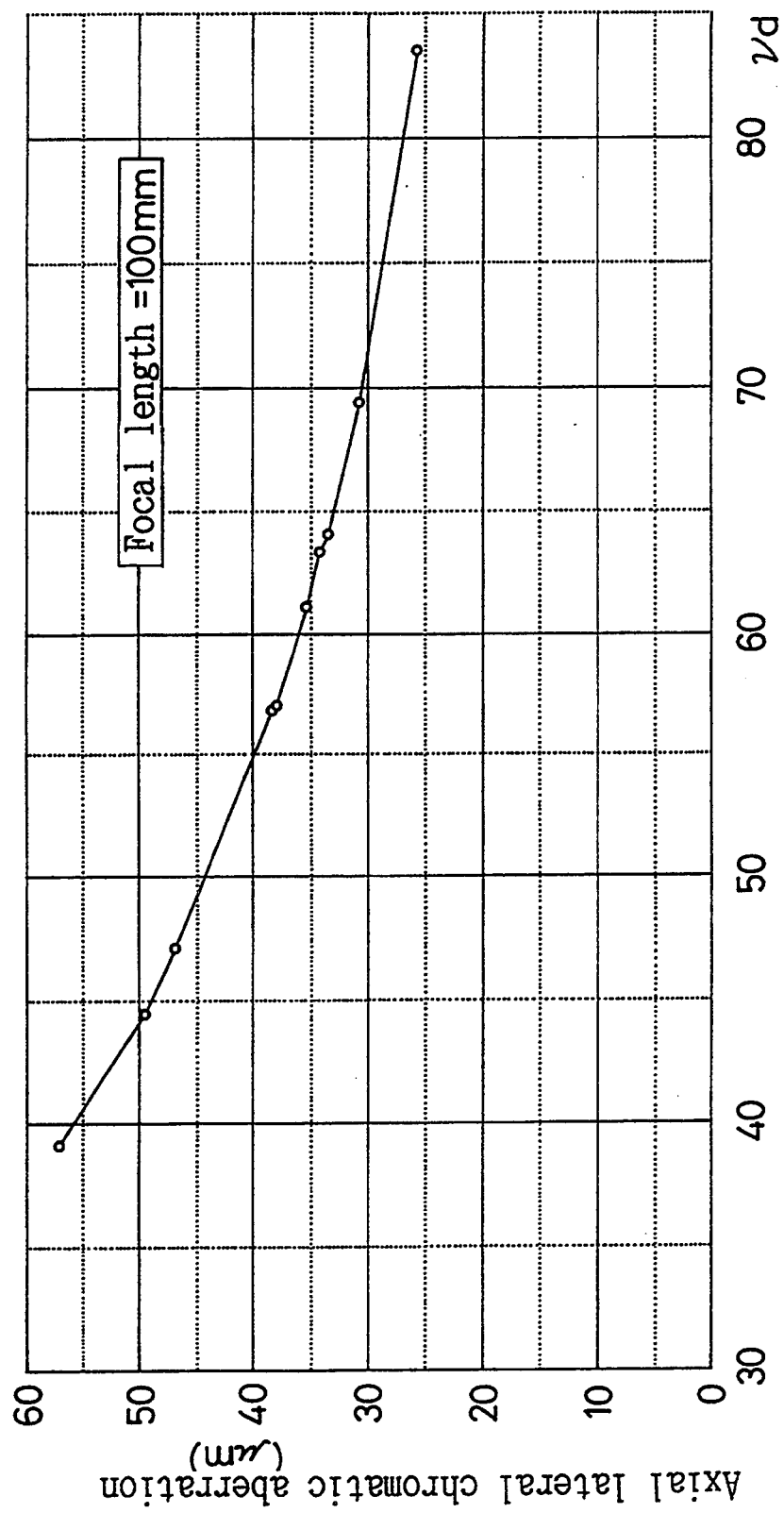
FIG. 34 graphically shows a relationship between the Abbe number and the axial lateral chromatic aberration when the angle of compensation of the axial light beam is 1° and the focal length of the taking optical system is 100 mm.

The axial lateral chromatic aberration is proportional to the focal length of the taking optical system. FIG. 34 graphically shows the change of the axial lateral chromatic aberration with respect to the Abbe number vd when the compensation angle of the axial light beam is 1° and the focal length of the taking optical system is 100 mm.

The relationship between the axial lateral chromatic aberration and the Abbe number is approximately expressed by the following equation (Fr3):

$$dY2 \times vd = 2200 \quad (Fr3)$$

where dY2 (the dimension of dY2 is $\mu$m) represents the axial lateral chromatic aberration.

By adding the focal length F1 (1 mm) of the taking optical system thereto, the following equation (Fr4) is obtained:

$$dY2 \times vd = 22 \times F1 \quad (Fr4)$$

Since it is preferable to restrain the axial lateral chromatic aberration from exceeding 45 $\mu$m, it is preferable to fulfill the following equation (Fr5):

$$22 \times F1/vd \leq 45 \quad (Fr5)$$

When the taking optical system is a zoom lens system, since the axial lateral chromatic aberration is larger at the longest focal length condition, the equation (Fr5) can be rewritten as follows by using the focal length F1t of the previously-described taking optical system (FIG. 19) at the longest focal length condition:

$$0.5 \times F1t \leq vd \quad (12)$$

It is preferable to use as the compensating lens a glass lens or a plastic lens having an Abbe number vd which fulfills the condition (12). Presently, the upper limit of the Abbe number vd of general glass lenses is approximately 85 for anomalous dispersion glass lenses and approximately 70 for general purpose glass lenses. When the longest focal length F1t is larger than approximately 150 mm in the condition (12), since the axial lateral chromatic aberration is large when the lens to be decentered is a single lens, it is required to use an achromatic lens consisting of two or more glass lenses.

It is understood from the above-described first to seventh embodiments that a surface which mainly contributes to the camera shake compensation in the camera shake compensating optical system (that is, a surface which inclines with respect to the optical axis due to the parallel decentering or the rotational decentering of the lens and bends the light beam in a direction so that the camera shake is compensated for) is situated at a position on the object side of the aperture stop of the taking optical system and away from the aperture stop, and the surface is a spherical surface convex to the object side.

In the previously-described first embodiment, the convex lens G2 (FIG. 2) is decentered in a direction vertical to the optical axis. At this time, although the surface R4 which is a plain surface does not change optically, the surface R3 convex to the object side optically inclines due to the decentering. In the second to fourth embodiments, the surface R3 convex to the object side also optically inclines. In the sixth embodiment, even if the second lens G2 is decentered, since the surface R3 is nearly a plain surface, the amount of the inclination of the surface R3 due to the decentering is small. The surface which mainly inclines to bend the light beam is the surface R4.

While in the first to seventh embodiments, only one surface convex to the object side mainly inclines for camera shake compensation, in a subsequently-described eighth embodiment, two surfaces optically incline due to the decentering of the lens.

Numerical data of the eighth embodiment are shown in Table 8 similarly to the first embodiment. Numerical data of the surface R5 and succeeding surfaces of the zoom lens system (that is, the taking optical system) are omitted since they are the same as those of the sixth embodiment. In order to improve aberration performance before the camera shake compensation when the compensating optical system of this embodiment and the zoom lens (FIG. 19) are combined, it is necessary to slightly correct aberrations of the zoom lens system. In this embodiment, however, since its object is to reduce the amount of over compensation of the off-axial light beam and the amount of aberration deterioration in the compensation by the compensating optical system, the explanation of the aberration correction of the zoom lens system will be omitted.

Figure 35:
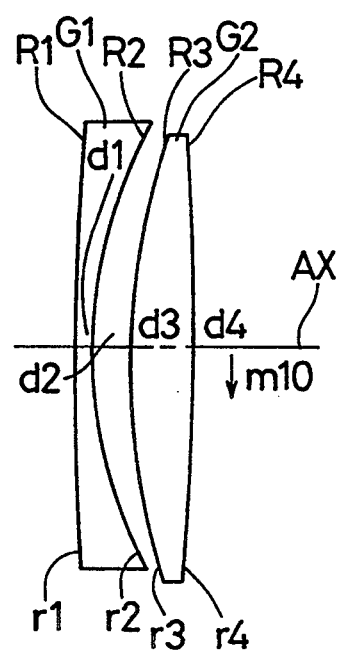
FIG. 35 shows a lens arrangement of an eighth embodiment of the present invention.

FIG. 35 shows a lens arrangement of the eighth embodiment in correspondence with the numerical data of Table 8. This embodiment comprises from the object side a negative meniscus lens G1 concave to the image side and a positive bi-convex lens G2. In compensating for camera shake, the second lens G2 which is a convex lens is moved in a direction vertical to the optical axis AX (in the direction of arrow m10) (that is, parallelly decentered). In the figure, the condition where the second lens G2 has been decentered is shown. This embodiment is a type where curvatures are provided to the surfaces R1 and R4 of the first embodiment. By providing the curvature to the surfaces of the first embodiment, aberration deterioration, particularly at the longer focal length condition is restrained, so that the zoom ratio of the zoom lens system can be increased.

When the second lens G2 is decentered in a direction vertical to the optical axis AX in the eight embodiment, the surfaces R3 and R4 incline. In order to bend a light beam coming from an object by 1.0° in a counterclockwise direction (referred to as positive direction) to compensate for camera shake, it is found from calculation that the second lens G2 should be moved upwardly from the optical axis AX by $\delta = 1.28$ mm. At this time, both the surfaces R3 and R4 are away from the optical axis AX by $\delta = 1.28$ mm. The angle of rotation of each surface can be calculated by the following equation (Fr6):

$$\arc \tan(\delta/r) \quad (Fr6)$$

where r represents a radius of curvature of a surface.

The surface R3 rotates by $+1.32°$. The surface R4 rotates by $-0.51°$. After all, the surface R3 optically inclines twice or more as much as the surface R4 in absolute value, and the surface on which the optical inclination occurs due to the camera shake compensation is the surface R3, that is, a surface convex to the object side.

If conditions for restraining the over compensation of the off-axial light beam including the case where a plurality of surfaces optically incline like in the eighth embodiment are quantitatively expressed by amending the previously mentioned conditions (8) and (9), the following conditions (13) and (14) are obtained:

$$0.29 \leq FLw \times \Sigma(\Phi i \times \Theta i) \quad (13)$$

$$0.22 \leq FLw \times \Sigma(\Phi i \times \Theta i) \quad (14)$$

where FLw represents the shortest focal length of the entire optical system including the camera shake compensating optical system and the zoom lens, $\Phi i$ represent a power of a surface to be displaced by the decentering of the compensating lens, and $\Theta i$ represents the angle of an optical inclination of a surface to be displaced when the compensating lens is decentering so that a principal light beam from an object is bent by 1° in a counterclockwise direction.

While in the conditions (8) and (9), limitations are made by the shortest focal length F1w of the zoom lens system, in the conditions (13) and (14), limitations are made by the shortest focal length of the entire optical system including the camera shake compensating optical system and the taking optical system. This is because these conditions hold even if the compensating optical system is of a type other than the afocal type.

$\Phi i$ represents the power of a surface (ith surface from the object side) which optically inclines with respect to the optical axis due to the lens movement (for example, the parallel decentering of the sixth embodiment and the rotational decentering of the seventh embodiment) at the time of the camera shake compensation. $\Phi i$ can be obtained by the following equation (Fr7):

$$\Phi i = (Ni' - Ni)/ri \quad (Fr7)$$

where Ni represents a refractive index of a portion on the object side of the surface to be displaced in the compensating lens, Ni' represents a refractive index of a portion on the image side of the surface to be displaced in the compensating lens, and ri represents a radius of curvature of the surface to be displaced in the compensating lens. When the surface to be displaced in the compensating lens is a plain surface, $\Phi i=0$.

$\Theta i$ represents the angle of the optical inclination of each surface (ith surface from the surface side) when the compensating lens is moved so that a principal light beam from an object is bent by the compensating optical system by 1° in a counter-clockwise direction (for example, the parallel decentering of the sixth embodiment and the rotational decentering of the seventh embodiment). $\Theta i$ is obtained by subsequently-described calculation.

In the case where the surface is a plain surface, $\Theta i=0$ when the compensating lens is parallelly decentered, and $\Theta i=$ [the angle of rotation of rotational displacement] (in this case, the counterclockwise direction is a positive direction) when the compensating lens is rotationally decentered. In the case where the surface is a spherical surface, first, a displacement amount $\delta i$ of the center of the spherical surface with respect to the optical axis in a direction vertical to the optical axis due to the parallel decentering or the rotational decentering of the lens is calculated. When the compensating lens is simply decentered in a direction vertical to the optical axis, $\delta i$ is the decentering amount (in this case, the upper direction is a positive direction). When the compensating lens is rotationally decentered, $\delta i$ is calculated by the following equation (Fr8):

$\delta i = Li \times \tan(\text{angle of rotation of the rotational decentering})$ (Fr8)

where Li represents a distance from the center of rotation to the spherical center of the surface to be displaced (in this case, the right direction is referred to as a positive direction).

The angle of rotation of the surface is expressed by the following equation (Fr9):

$\Theta i = \arctan(\delta i / ri)°$ (Fr9)

where ri represents a radius of curvature of an ith surface form the object side.

In the above calculation, the object side is always the left side, and regarding the directions along and vertical to the optical axis, the right direction and the upper direction are positive directions. Regarding the rotation, the counter-clockwise direction is a positive direction, and the unit of the rotation is degree (°). $\Sigma$ in the conditions (13) and (14) represents the total sum of ($\Phi i \times \Theta i$) with respect to all of the surfaces which optically incline due to camera shake compensation.

The meaning of the right sides of the conditions (13) and (14) will be explained. The right sides of the previously-described conditions (8) and (9) include the curvature C. In the case where a plurality of surfaces optically incline like in the eighth embodiment, it is important how much each surface bends the light beam for camera shake compensation. Therefore, in these conditions, the curvature ($=1/ri$) of each surface is weighted by the refractive index of each surface and by the angle of the optical inclination of each surface for camera shake compensation. Since, when the camera shake compensation is made by $+1°$, $\Sigma((Ni'-Ni) \times \Theta i)$ is approximately $+1$ regardless of the arrangement of the compensating optical system, the values of the left sides of the conditions (13) and (14) are approximately the same as those of the conditions (8) and (9).

For the application to the conditions (13) and (14), first, $\Phi i$ and $\Theta i$ are calculated with respect to all the surfaces which inclines due to the movement of the lens such as the parallel decentering and the rotational decentering, and after $\Phi i$ and $\Theta i$ are multiplied together, all the multiplication results are summed. If the product of the sum multiplied by FLw fulfills the conditions (13) and (14), the amount of over compensation of the off-axial light beam will be restrained.

Tables 11, 12 and 13 show data and calculation results (when the angle of camera shake compensation is $+1°$) in connection with the values of the right sides of the conditions (13) and (14) for the first to fourth and sixth to eighth embodiments. In the tables, similar data and calculation results for Japanese Laid-open Patent Application No. H2-238430 and for Japanese Laid-open Patent Application No. H1-116619 (when the first lens unit is decentered) are also shown for comparison. In the decentering type column of Table 11, P represents the parallel decentering and R represents the rotational decentering.

In the case where one surface optically inclines like in the first to fourth, sixth and seventh embodiments, $\Phi i \times \Theta i$ is approximately the same as the curvature ($=1/ri$) of the surface. In this case, it is understood that the conditions (13) and (14) are synonymous with the conditions (8) and (9). H2-238430 does not fulfill these conditions. Actually, in H2-238430, the amount of over compensation of the off-axial light beam is within a permissible range. This is because the required effective aperture of the compensating optical system is large; in a lens system for use in a video camera where the maximum image height Y7 is small (Y'=4.1 mm), the required effective aperture of the compensating optical system is as much as approximately $\phi60$ mm.

In the embodiments of the present invention, in the case of the optical system for a 35 mm film format whose image plane is several times larger than that for a video camera, while the maximum image height Y' is 21.6 mm, the effective aperture of the compensating optical system is at most $\phi30$ mm which is the half or less of the above. If H2-238430 is calculated in the 35 mm film format equivalent, the effective aperture is $\phi300$ mm or more, which is completely impractical. Therefore, in order to realize a compact camera shake compensating optical system like the embodiments of the present invention, it is necessary to fulfill the conditions (13) and (14).

H1-116619 fulfills the conditions (13) and (14). However, since the compensating lens to be decentered for camera shake includes a surface having an aspherical configuration, the amount of over compensation of the off-axial light beam is remarkably large; it is as much as approximately 200 $\mu$m with respect to an off-axial light beam with a bending angle of the optical axis of 1° and an image height Y' of 15 mm. Subsequently, conditions for the case where the compensating lens to be decentered includes an aspherical configuration will be described.

First, the reason why the amount of over compensation of the off-axial light is large in H1-116619 will be explained. At a surface R2 of H1-116619 having an aspherical configuration, the principal light beam of the off-axial light beam with an image height Y' of 15 mm passes at a height of approximately 8.5 mm. Since the surface R2 vertically moves due to the decentering of the compensating lens for camera shake compensation, the inclination of the surface at a height of approximately 8.5 mm was examined. The results thereof are shown in Table 14. When the angle of bending of the optical axis is 1°, the decentering amount of the compensating lens is slightly over 1 mm.

It is clearly understood from the data in Table 14 that in the case where an aspherical surface is included, the inclination of the tangent plane is largely changed by the vertical movement of the compensating lens to increase the amount of over compensation of the off-axial light beam.

A quantitative condition for restraining the amount of over compensation of the off-axial light beam due to the aspherical surface will be described. As previously shown, the amount of over compensation of the off-axial light beam due to the aspherical surface is expressed by a change of the inclination of the tangent plane. The inclination of the tangent plane due to the aspherical surface is calculated from an optical axis height h by a differentiation $\Delta G = d\Delta x/dh$ where $\Delta x$ represents a displacement from a reference spherical surface due to the aspherical surface. The change of the inclination of the tangent plane due to the aspherical surface is calculated by $\Delta S = d\Delta G/dh$ which is a further differentiation of the above. Since the amount of over compensation of the off-axial light beam due to the aspherical surface is also influenced by the movement amount of the aspherical surface due to the decentering of the lens and by the refractive index of the lens, the amount of over compensation of the off-axial light beam due to the aspherical surface can be estimated by the magnitude of the value of the following condition (Fr10):

$$Fi = \Delta Si(hi) \times (Ni' - Ni) \times Oi \qquad (Fr10)$$

The meaning of each variable of the right side of the condition (Fr10) will be explained. In $\Delta Si(hi)$, hi represents a height from the optical axis to a point at which the off-axial light beam passes through the aspherical surface when the image height Y' is 15 (70% of the most off-axial image height in 35 mm film). $\Delta Si(hi)$ represents a displacement amount $\Delta x$ of the aspherical surface from the reference surface at hi which displacement amount is twice differentiated by the optical axis height h. Oi represents a movement amount of the vertex of the aspherical surface in the direction vertical to the optical axis when the lens is decentered in order to compensate for camera shake once. $\Delta x$ represents a difference between X of the equation (7) and $X_0$ which is the value of X when $\epsilon$ and Ai are changed to 1 and 0, respectively.

The value of Fi which brings the amount of over compensation of the off-axial light beam into a permissible range will be explained based on the previously-described 6th embodiment. The relationship between Fi and the amount of over compensation of the off-axial light beam when the surface R4 of the sixth embodiment is aspherical (that is, the value of A4 is changed) is shown in Table 15.

In order to restrain the amount of over compensation of the off-axial light beam due to the aspherical surface to be at worst 100μ or less, it is required that Fi is less than approximately $2.0 \times 10^{-3}$.

In H1-116619, since
$\Delta Si(hi) = 0.0079$
$Ni' - Ni = -0.72$
$Oi = -1.2$,
Fi is as much as $6.8 \times 10^{-3}$. From this, it is found that the amount of over compensation of the off-axial light beam is large.

In general compensating optical systems, when a plurality of aspherical surfaces are included, Fi with respect to each aspherical surface are summed. The case where Fi is negative is less problematic, since although the under compensation of the off-axial light beams occurs, the over compensation occurs when a factor other than the aspherical surfaces exists. FIGS. 13 and 14 show aberrations when an aspherical surface is employed for the first embodiment. The aspherical surface has a small curvature. Since $\Delta Si(hi)$ and Fi are negative for that reason, the amount of over compensation of the off-axial light beam is restrained to be small by the aspherical surface.

Therefore, in general compensating optical systems, when a plurality of aspherical surface are included, it is preferable to fulfill the following condition (15):

$$\Sigma\{\Delta Si(hi) \times (Ni' - Ni) \times Oi\} \leq 2.0 \times 10^{-3} \qquad (15)$$

While the explanation was centered on the amount of over compensation of the off-axial light beam on the shorter focal length condition in the above, the aberration deterioration will subsequently be explained. In the case of the camera shake compensation of the zoom lens system, the aberration deterioration is problematic at the longer focal length condition. In the first to seventh embodiments, at the longer focal length condition, the compensating optical system is further away from the aperture stop toward the object side compared to at the shorter focal length condition. This arrangement is one of the ways to reduce the aberration deterioration at the longer focal length condition.

When the compensating lens is situated at a position on the object side of the aperture stop of the zoom lens system, as the focal length of the zoom lens system shifts from the shorter focal length condition to the longer focal length condition, it is preferable that the position of the compensating lens at least does not move or moves toward the object side so as to be further away from the aperture stop. Although it depends on the zoom ratio of the zoom lens system, it is preferable that the distance between the compensating optical system and the aperture stop is at least the same at the shorter and longer focal length conditions or that the compensating optical system is further away from the aperture stop toward the object side at the longer focal length condition.

In the previously-shown H1-116619, conversely to the embodiments of the present invention, since the compensating optical system and the aperture stop are closer to each other at the longer focal length condition, the aberration deterioration at the longer focal length condition is very large. This aberration deterioration, together with the amount of over compensation of the off-axial light beam due to the aspherical surface at the shorter focal length condition, largely deteriorates the image when camera shake compensation is made approximately one degree. In the calculation of H1-116619, only camera shake compensation with a camera shake angle of 9 minutes (=0.15°) is shown.

Further, in order to restrain the aberration deterioration at the longer focal length condition, it is preferable to fulfill the following condition (16) in the same sense as the case of condition (9):

$$FLt \times \Sigma(\Phi i \times \Theta i) \leq 2.86 \qquad (16)$$

where FLt represents the longest focal length of the entire system including the compensating optical system and the zoom lens system. The definitions of $\Phi i$ and $\Theta i$ are the same as those of the conditions (13) and (14). As shown in the explanation of the conditions (13) and (14), when one surface optically inclines, $\Phi i \times \Theta i$ is approximately the same as the curvature $(=1/ri)$ of the surface, and that the curvature of the surface to be optically inclined is large shows that the aberration deterioration at the longer focal length condition is large. Table 13 also shows the values of the left side of the condition (16) in each embodiment.

Obviously, many modifications and variations of the present invention are possible in light of the above teachings. It is therefore to be understood that within the scope of the appended claims, the invention may be practiced other than as specifically described.

TABLE 1

<1st Embodiment and Taking Optical System>
fALL = 35 to 77    FNo. = 3.62 to 7.75

| Radius of Curvature | | Axial Distance | | Refractive Index | | Abbe Number |
|---|---|---|---|---|---|---|
| <<1st Embodiment LC>> | | | | | | |
| r1 | −1892.2 | | | | | |
| | | d1 | 1.5 | N1 | 1.6968 | ν1 56.5 |
| r2 | 40.5 | | | | | |
| | | d2 | 0.5 | | | |
| r3 | 40 | | | | | |
| | | d3 | 2.5 | N2 | 1.6968 | ν2 56.5 |
| r4 | ∞ | d4 | 5.5 to 14.65 | | | |
| <<1st Lens Unit L1 of the Taking Optical System>> | | | | | | |
| r5* | 23.106 | | | | | |
| | | d5 | 2.3 | N3 | 1.5834 | ν3 31 |
| r6* | 12.604 | | | | | |
| | | d6 | 4.568 | | | |
| r7 | 39.982 | | | | | |
| | | d7 | 4.13 | N4 | 1.51728 | ν4 69.4 |
| r8* | −12.342 | | | | | |
| | | d8 | 13 to 3.85 | | | |
| <<2nd Lens Unit L2 of the Taking Optical System>> | | | | | | |
| r9* | −42.406 | | | | | |
| | | d9 | 3.68 | N5 | 1.493 | ν5 57.8 |
| r10 | −24.822 | | | | | |
| | | d10 | 4.825 | | | |
| r11 | −10.68 | | | | | |
| | | d11 | 1 | N6 | 1.6968 | ν6 56.5 |
| r12 | −49.657 | | | | | |

Aspherical Coefficients

| | r5 | r6 | r8 | r9 |
|---|---|---|---|---|
| ε | 0.97655 | 1.11027 | 1.29649 | 0.97478 |
| A4 | $-3.35 \times 10^{-4}$ | $-3.00 \times 10^{-4}$ | $3.46 \times 10^{-5}$ | $8.16 \times 10^{-5}$ |
| A5 | $-6.04 \times 10^{-6}$ | $-5.41 \times 10^{-6}$ | $-2.50 \times 10^{-7}$ | $-6.00 \times 10^{-6}$ |
| A6 | $1.12 \times 10^{-7}$ | $6.41 \times 10^{-7}$ | $8.78 \times 10^{-8}$ | $5.87 \times 10^{-7}$ |
| A7 | $5.68 \times 10^{-9}$ | $8.35 \times 10^{-8}$ | $1.72 \times 10^{-8}$ | $4.42 \times 10^{-8}$ |
| A8 | $-7.51 \times 10^{-10}$ | $6.27 \times 10^{-9}$ | $1.60 \times 10^{-9}$ | $-1.84 \times 10^{-9}$ |
| A9 | $-1.47 \times 10^{-11}$ | $-2.04 \times 10^{-11}$ | $2.92 \times 10^{-12}$ | $-3.51 \times 10^{-11}$ |
| A10 | $-2.18 \times 10^{-12}$ | $-2.56 \times 10^{-12}$ | $-7.05 \times 10^{-13}$ | $-1.56 \times 10^{-12}$ |
| A11 | $-2.63 \times 10^{-13}$ | $-2.90 \times 10^{-13}$ | $-1.51 \times 10^{-13}$ | $1.98 \times 10^{-13}$ |
| A12 | $-2.91 \times 10^{-14}$ | $-3.09 \times 10^{-14}$ | $-2.10 \times 10^{-14}$ | $5.94 \times 10^{-14}$ |

TABLE 2

<2nd Embodiment>

| Radius of Curvature | | Axial Distance | | Refractive Index | | Abbe Number |
|---|---|---|---|---|---|---|
| r1 | ∞ | | | | | |
| | | d1 | 1.5 | N1 | 1.7725 | ν1 49.8 |
| r2 | 51 | | | | | |
| | | d2 | 0.5 | | | |
| r3 | 40 | | | | | |
| | | d3 | 2.5 | N2 | 1.6031 | ν2 60.7 |

TABLE 2-continued

<2nd Embodiment>

| Radius of Curvature | | Axial Distance | Refractive Index | Abbe Number |
|---|---|---|---|---|
| r4 | ∞ | | | |

$\phi = 0$
$\gamma = 0.993$

TABLE 3

<3rd Embodiment>

| Radius of Curvature | | Axial Distance | | Refractive Index | | Abbe Number |
|---|---|---|---|---|---|---|
| r1 | 42 | | | | | |
| | | d1 | 1.5 | N1 | 1.67 | ν1 57 |
| r2 | 20 | | | | | |
| | | d2 | 0.5 | | | |
| r3 | 19.5 | | | | | |
| | | d3 | 2.5 | N2 | 1.67 | ν2 57 |
| r4 | 40 | | | | | |

$\phi = 0.001$
$\gamma = 1.032$

TABLE 4

<4th Embodiment>

| Radius of Curvature | | Axial Distance | | Refractive Index | | Abbe Number |
|---|---|---|---|---|---|---|
| r1 | ∞ | | | | | |
| | | d1 | 1.5 | N1 | 1.67 | ν1 57 |
| r2 | 80 | | | | | |

TABLE 4-continued

<4th Embodiment>

| Radius of Curvature | | Axial Distance | | Refractive Index | | Abbe Number | |
|---|---|---|---|---|---|---|---|
| | | d2 | 0.5 | | | | |
| r3 | 80 | | | | | | |
| | | d3 | 2.5 | N2 | 1.67 | $\nu 2$ | 57 |
| r4 | −30 | | | | | | |
| | | d4 | 0 | | | | |
| r5 | −30 | | | | | | |
| | | d5 | 1.5 | N3 | 1.67 | $\nu 3$ | 47 |
| r6 | ∞ | | | | | | |

$\phi = 0$
$\gamma = 0.996$

TABLE 5

<5th Embodiment>

| Radius of Curvature | | Axial Distance | | Refractive Index | | Abbe Number | |
|---|---|---|---|---|---|---|---|
| r1 | 40 | | | | | | |
| | | d1 | 2.5 | N1 | 1.6968 | $\nu 1$ | 56.5 |
| r2 | ∞ | | | | | | |
| | | d2 | 0.0 | | | | |
| r3 | ∞ | | | | | | |
| | | d3 | 1.5 | N2 | 1.6968 | $\nu 2$ | 56.5 |
| r4 | 40 | | | | | | |

TABLE 6

<6th Embodiment and Taking Optical System>
fALL = 37.7 to 106.5  FNo. = 4.1 to 7.9

| Radius of Curvature | | Axial Distance | | Refractive Index | | Abbe Number | |
|---|---|---|---|---|---|---|---|
| <<6th Embodiment LC>> | | | | | | | |
| r1 | 45.729 | | | | | | |
| | | d1 | 3.892 | N1 | 1.52510 | $\nu 1$ | 56.38 |
| r2 | −500.000 | | | | | | |
| | | d2 | 0.800 | | | | |
| r3 | −500.000 | | | | | | |
| | | d3 | 1.200 | N2 | 1.52510 | $\nu 2$ | 56.38 |
| r4 | 43.478 | | | | | | |
| | | d4 | 2.108 | | | | |
| <<1st Lens Unit L1 of the Taking Optical System>> | | | | | | | |
| r5 | 45.249 | | | | | | |
| | | d5 | 1.400 | N3 | 1.84666 | $\nu 3$ | 23.82 |
| r6* | 34.554 | | | | | | |
| | | d6 | 0.600 | | | | |
| r7 | 19.472 | | | | | | |
| | | d7 | 4.800 | N4 | 1.49310 | $\nu 4$ | 83.58 |
| r8 | 111.288 | | | | | | |
| | | d8 | 2.500 to 9.281 to 17.763 | | | | | |
| <<2nd Lens Unit L2 of the Taking Optical System>> | | | | | | | |
| r9* | 159.975 | | | | | | |
| | | d9 | 1.563 | N5 | 1.72000 | $\nu 5$ | 54.71 |
| r10 | 9.346 | | | | | | |
| | | d10 | 1.875 | N6 | 1.67339 | $\nu 6$ | 29.25 |
| r11* | 14.707 | | | | | | |
| | | d11 | 1.938 | | | | |
| r12 | ∞ | | | | | | |
| | | d12 | 1.250 | | | | |
| r13 | 23.350 | | | | | | |
| | | d13 | 1.438 | N7 | 1.83350 | $\nu 7$ | 21.00 |
| r14 | 16.949 | | | | | | |
| | | d14 | 4.800 | N8 | 1.51728 | $\nu 8$ | 69.43 |
| r15* | −10.609 | | | | | | |
| | | d15 | 0.188 | | | | |
| r16 | ∞ | | | | | | |
| | | d16 | 13.538 to 7.094 to 2.000 | | | | | |
| <<3rd Lens Unit L3 of the Taking Optical System>> | | | | | | | |
| r17* | −45.439 | | | | | | |
| | | d17 | 3.800 | N9 | 1.84666 | $\nu 9$ | 23.82 |
| r18 | −29.178 | | | | | | |
| | | d18 | 3.450 | | | | |
| r19* | −11.467 | | | | | | |
| | | d19 | 1.400 | N10 | 1.69680 | $\nu 10$ | 56.47 |
| r20 | −602.199 | | | | | | |

| Aspherical Coefficients | | |
|---|---|---|
| r6 | r9 | r11 |
| $\epsilon$  1.0000 | 1.0000 | 1.0000 |
| A4  $0.23301727 \times 10^{-5}$ | $-0.10668840 \times 10^{-3}$ | $0.19501904 \times 10^{-4}$ |
| A6  $0.12235027 \times 10^{-7}$ | $0.65794475 \times 10^{-7}$ | $0.19679760 \times 10^{-5}$ |
| A8  $-0.11539892 \times 10^{-9}$ | $-0.30296544 \times 10^{-8}$ | $0.17263757 \times 10^{-7}$ |
| A10  $0.61206229 \times 10^{-12}$ | $0.15488483 \times 10^{-10}$ | $0.44427887 \times 10^{-10}$ |
| A12  $-0.86583795 \times 10^{-15}$ | $-0.68126753 \times 10^{-14}$ | $0.15765695 \times 10^{-12}$ |
| r15 | r17 | r19 |
| $\epsilon$  1.0000 | 1.0000 | 1.0000 |
| A4  $0.15471185 \times 10^{-4}$ | $0.32553360 \times 10^{-4}$ | $0.51933500 \times 10^{-4}$ |
| A6  $-0.22085946 \times 10^{-6}$ | $-0.45499756 \times 10^{-6}$ | $0.13296847 \times 10^{-6}$ |
| A8  $-0.85576839 \times 10^{-8}$ | $0.98116623 \times 10^{-8}$ | $0.30176792 \times 10^{-8}$ |

TABLE 6-continued

<6th Embodiment and Taking Optical System>
fALL = 37.7 to 106.5    FNo. = 4.1 to 7.9

| | | | |
|---|---|---|---|
| A10 | $0.12778241 \times 10^{-10}$ | $-0.96690819 \times 10^{-10}$ | $-0.18781503 \times 10^{-10}$ |
| A12 | $0.12024363 \times 10^{-12}$ | $0.45863179 \times 10^{-12}$ | $0.13524501 \times 10^{-12}$ |

Lens power of G1 (r1 and r2) = +0.0125
Lens power of G2 (r3 and r4) = −0.0131
Fℓw × C4 = 0.828
Fℓt × C4 = 2.346

TABLE 7

<7th Embodiment>

| Radius of Curvature | | Axial Distance | | Refractive Index | | Abbe Number | |
|---|---|---|---|---|---|---|---|
| r1 | 85.476 | | | | | | |
| | | d1 | 1.200 | N1 | 1.52510 | ν1 | 56.38 |
| r2 | 27.027 | | | | | | |
| | | d2 | 0.825 | | | | |
| r3 | 27.174 | | | | | | |
| | | d3 | 3.500 | N2 | 1.52510 | ν2 | 56.38 |
| r4 | 83.333 | | | | | | |
| | | d4 | 2.476 | | | | |

Decentering rotation center (from the vertex of r2) of G1 = 27.800
Decentering rotation center (from the vertex of r3) of G2 = 27.975

Lens power of G1 (r1 and r2) = −0.0132
Lens power of G2 (r3 and r4) = +0.0133
Fℓw × C1 = 0.421
Fℓt × C1 = 1.193
Fℓw × C4 = 0.432
Fℓt × C4 = 1.224

TABLE 8

<8th Embodiment>

| Radius of Curvature | | Axial Distance | | Refractive Index | | Abbe Number | |
|---|---|---|---|---|---|---|---|
| r1 | 246.14 | | | | | | |
| | | d1 | 1.200 | N1 | 1.52510 | ν1 | 56.38 |
| r2 | 33.33 | | | | | | |
| | | d2 | 2.523 | | | | |
| r3 | 55.55 | | | | | | |
| | | d3 | 4.053 | N2 | 1.52510 | ν2 | 56.38 |
| r4 | −142.86 | | | | | | |
| | | d4 | 1.000 | | | | |

TABLE 9

| | Condition | | |
|---|---|---|---|
| | (1) $|\phi|/\phi f$ | (2) $\gamma$ | (3) $d < r3/20$ |
| 1st Embodiment | 0 | 0.991 | 0.5 < 2 |
| 2nd Embodiment | 0 | 0.993 | 0.5 < 2 |
| 3rd Embodiment | 0.024 | 1.032 | 0.5 < 0.975 |
| 4th Embodiment | 0 | 0.996 | 0.5 < 4 |

TABLE 10

Condition (6)
$(0.454/Y') - (0.27/Y') \cdot ((1.3/\tan\omega) - 0.73)^{\frac{1}{2}}$
$\leq C_0 \leq$
$(1.816/Y') + (1.808/Y') \cdot ((1.3/\tan\omega) - 0.73)^{\frac{1}{2}}$;
Y' = 21.63

| | |
|---|---|
| 1st Embodiment | 0.006 < 0.025 < 0.184 |
| | −0.004 < 0.025 < 0.077 |
| 2nd Embodiment | 0.009 < 0.025 < 0.165 |
| | −0.004 < 0.025 < 0.253 |
| 3rd Embodiment | 0.010 < 0.051 < 0.154 |
| 4th Embodiment | −0.013 < 0.013 < 0.311 |

TABLE 11

| | Optically inclining surface | ri | Ni' − Ni | Φi | Decentering type |
|---|---|---|---|---|---|
| 1st embodiment | R3 | 40 | 0.6968 | 0.017 | P |
| 2nd embodiment | R3 | 40 | 0.6031 | 0.015 | P |
| 3rd embodiment | R3 | 19.5 | 0.67 | 0.034 | R |
| 4th embodiment | R3 | 80 | 0.67 | 0.008 | R |
| 6th embodiment (See *1) | R1 | 45.729 | 0.5251 | 0.011 | P |
| | R2 | −500 | −0.5251 | 0.001 | |
| 6th embodiment (See *2) | R3 | −500 | 0.5251 | −0.001 | P |
| | R4 | 43.478 | −0.5251 | −0.012 | |
| 7th embodiment (See *1) | R1 | 85.476 | 0.5251 | 0.006 | R |
| | R2 | 27.027 | −0.5251 | −0.019 | |
| 7th embodiment (See *2) | R3 | 27.174 | 0.5251 | 0.019 | R |
| | R4 | 83.333 | −0.5251 | −0.006 | |
| 8th embodiment | R3 | 55.55 | 0.5251 | 0.009 | P |
| | R4 | −142.86 | −0.5251 | 0.004 | |
| H2-238430 | R5 | 54.477 | 0.49171 | 0.009 | R |
| | R6 | −279.13 | −0.49171 | 0.002 | |
| H1-116619 (See *3) | R1 | −1370.59 | 0.72 | −0.001 | P |
| | R2 | 20.97 | −0.72 | −0.034 | |
| | R3 | 20.05 | 0.68893 | 0.034 | |
| | R4 | 45.79 | −0.68893 | −0.015 | |

*1: compensation with G1
*2: compensation with G2
*3: compensation with the 1st lens unit

TABLE 12

| | Displacement amount | Li | δi (mm) | Φi (°) | Φi × Θi |
|---|---|---|---|---|---|
| 1st embodiment | 1.00 mm | | 1.00 | 1.43 | 0.025 |
| 2nd embodiment | 1.15 mm | | 1.15 | 1.64 | 0.025 |
| 3rd embodiment | −1.27° | −23.00 | 0.51 | 1.50 | 0.052 |
| 4th embodiment | 1.11° | 107.50 | 2.07 | 1.48 | 0.012 |
| 6th embodiment | 1.40 mm | | 1.40 | 1.75 | 0.020 |
| 6th embodiment (See *1) | 1.40 mm | | 1.40 | −1.16 | 0.000 |
| 6th embodiment (See *1) | −1.40 mm | | −1.40 | 0.16 | 0.000 |
| 6th embodiment (See *2) | −1.40 mm | | −1.40 | −1.84 | 0.002 |
| 7th embodiment (See *1) | 2.81° | 56.48 | 2.77 | 1.86 | 0.011 |
| | 2.81° | −0.77 | −0.04 | −0.08 | 0.002 |
| 7th embodiment (See *2) | −2.62° | −0.80 | 0.04 | 0.08 | 0.001 |
| | −2.62° | 58.86 | −2.69 | −1.85 | 0.012 |
| 8th | 1.28 mm | | 1.28 | 1.32 | 0.012 |

TABLE 12-continued

| | Displacement amount | Li | δi (mm) | Φi (°) | Φi × Θi |
|---|---|---|---|---|---|
| embodiment | 1.28 mm | | 1.28 | −0.51 | −0.002 |
| H2-238430 | −0.95° | −45.62 | 0.76 | 0.80 | 0.007 |
| | −0.95° | −365.23 | 6.06 | −1.24 | −0.002 |
| H1-116619 (See *3) | −1.20 mm | | −1.20 | 0.05 | 0.000 |
| | −1.20 mm | | −1.20 | −3.28 | 0.112 |
| | −1.20 mm | | −1.20 | −3.43 | −0.118 |
| | −1.20 mm | | −1.20 | −1.50 | 0.023 |

*1: compensation with G1
*2: compensation with G2
*3: compensation with the 1st lens unit

TABLE 13

| | FLw | FLw × Σ (Φi × Θi) | FLt | FLt × Σ (Φi × Θi) |
|---|---|---|---|---|
| 1st embodiment | 35.9 | 0.897 | 76.8 | 1.920 |
| 2nd embodiment | 35.9 | 0.890 | 76.8 | 1.903 |
| 3rd embodiment | 24 | 1.237 | 50 | 2.577 |
| 4th embodiment | 135 | 1.679 | 200 | 2.487 |
| 6th embodiment (See *1) | 37.9 | 0.755 | 107 | 2.130 |
| 6th embodiment (See *2) | 37.9 | 0.835 | 107 | 2.359 |
| 7th embodiment (See *1) | 36.4 | 0.472 | 103 | 1.336 |
| 7th embodiment (See *2) | 36.4 | 0.479 | 103 | 1.354 |
| 8th embodiment | 36 | 0.381 | 102 | 1.080 |
| H2-238430 | 7.9 | 0.039 | 73.5 | 0.367 |
| H1-116619 (See *3) | 36 | 0.624 | 67.9 | 1.176 |

*1: compensation with G1
*2: compensation with G2
*3: compensation with the 1st lens unit

TABLE 14

| Height from the optical axis | Inclination of tangent plane in the case of spherical surface | Inclination of tangent plane in the case of aspherical surface |
|---|---|---|
| 7.5 mm | 21.0° | 21.5° |
| | Angle difference: 2.9 | Angle difference: 3.3 |
| 8.5 mm | 23.9° | 24.8° |
| | Angle difference: 3.0 | Angle difference: 3.4 |
| 9.5 mm | 26.9° | 28.2° |

TABLE 15

<When R4 of the 6th Embodiment Is Aspherical>
(Camera Shake Compensation 1°)

| Aspherical coefficient (A4) | ΔSi (hi) | Fi | Over compensation amount (μm) |
|---|---|---|---|
| 0.0 | 0.0 | 0.0 | 6.1 |
| $1.0 \times 10^{-6}$ | $0.57 \times 10^{-3}$ | $0.42 \times 10^{-3}$ | 27.0 |
| $2.0 \times 10^{-6}$ | $1.14 \times 10^{-3}$ | $0.84 \times 10^{-3}$ | 47.3 |
| $3.0 \times 10^{-6}$ | $1.71 \times 10^{-3}$ | $1.26 \times 10^{-3}$ | 66.9 |
| $4.0 \times 10^{-6}$ | $2.29 \times 10^{-3}$ | $1.68 \times 10^{-3}$ | 85.9 |
| $5.0 \times 10^{-6}$ | $2.86 \times 10^{-3}$ | $2.10 \times 10^{-3}$ | 104.2 | hi = 6.9
Ni′ − Ni = −0.5251
Oi = −1.4

What is claimed is:

1. A camera shake compensating optical system for use in a zoom lens system where any blurring of an image to be recorded when the zoom lens system is moved relative to an aligned object on an optical axis of the zoom lens system having an aperture stop is compensated comprising:

a compensating lens movably positioned, on an object side of the aperture stop, so that it is decentered relative to the optical axis in order to compensate for any blurring;

wherein as a focal length of said zoom lens system shifts from a shorter focal length condition to a longer focal length condition, the position of said compensating lens at least does not shift relative to said aperture stop or shifts toward the object side so as to be further away from the aperture stop; and wherein the following condition is fulfilled:

$$0.22 \leq FLw \times \Sigma(\Phi i \times \Theta i)$$

where

FLw represents a shortest focal length of an entire system including the camera shake compensating optical system and the zoom lens system;

Φi represents a power of a refractive surface to be displaced due to the decentering of the compensating lens;

Θi represents an angle of optical inclination of the surface to be displaced with respect to said optical axis of said zoom lens system when the compensating lens is decentered so that a principal light beam from an object is bent by one degree in a counterclockwise direction by the camera shake compensating optical system; and Σ represents a total sum of the product of Φi and Θi with respect to all of the optical surfaces to be displaced by the decentering of the compensating lens.

2. A camera shake compensating optical system as claimed in claim 1, wherein the following equation is further fulfilled:

$$FLt \times \Sigma(\Phi i \times \Theta i) \leq 2.86$$

where FLt represents a longest focal length of the entire system including the camera shake compensating optical system and the zoom lens system.

3. A camera shake compensating optical system as claimed in claim 1, wherein the following condition is further fulfilled:

$$|\Phi i| \geq 0.0087$$

4. A camera shake compensating optical system as claimed in claim 1, wherein said compensating lens to be displaced in camera shake compensation consists of one lens element, and an Abbe number thereof fulfills the following condition:

$$0.5 \times FLt \leq vd$$

where vd represents the Abbe number.

5. A camera shake compensating optical system as claimed in claim 1, said camera shake compensating optical system including a plurality of aspherical surfaces and fulfilling the following condition:

$$\Sigma\{\Delta Si(hi) \times (Ni' - Ni) \times Oi\} \leq 2.0 \times 10^{-3}$$

where $h_i$ represents a height from the optical axis to a point at which an off-axial light beam passes through an aspherical surface at an image height Y' which is 70% of a maximum image height in 35 mm film;

$\Delta S_i(h_i)$ represents a twice difference of a displacement amount by an optical axis height h, said displacement being from a reference spherical surface of the aspherical surface at $h_i$;

$N_i$ represents a refractive index of a portion of the compensating lens on an object side of the surface to be displaced;

$N_i'$ represents a refractive index of a portion of the compensating lens on an image side of the surface to be displaced; and $O_i$ represents a movement amount of a vertex of the aspherical surface in a direction vertical to the optical axis when the lens is decentered in order to bend the principal light beam from the object by one degree in the counterclockwise direction by the camera shake compensating optical system.

6. A camera shake compensating optical system for use in a zoom lens system where any blurring of an image to be recorded when the zoom lens system is moved relative to an aligned object on an optical axis of the zoom lens system is compensated comprising:

an aperture stop for said zoom lens; and a compensating lens movably positioned, on an object side of the aperture stop, so that it is decentered relative to the optical axis in order to compensate for any blurring;

wherein as a focal length of said zoom lens system shifts from a shorter focal length condition to a longer focal length condition, the position of said compensating lens at least does not shift relative to said aperture stop or shifts toward the object side so as to be further away from the aperture stop; and wherein the following conditions are fulfilled:

$$0.22 \leq FL_w \times \Sigma(\Phi_i \times \Theta_i) \quad |\Phi_i| \geq 0.0087$$

where $FL_w$ represents a shortest focal length of an entire system including the camera shake compensating optical system and the zoom lens system;

$\Phi_i$ represents a power of a refractive surface to be displaced due to the decentering of the compensating lens;

$\Theta_i$ represents an angle of optical inclination of the surface to be displaced with respect to said optical axis of said zoom lens system when the compensating lens is decentered so that a principal light beam from an object is bent by one degree in a counterclockwise direction by the camera shake compensating optical system; and $\Sigma$ represents a total sum of the product of $\Phi_i$ and $\Theta_i$ with respect to all of the optical surfaces to be displaced by the decentering of the compensating lens.

7. A camera shake compensating optical system for use in a zoom lens system where any blurring of an image to be recorded when the zoom lens system is moved relative to an aligned object on an optical axis of the zoom lens system having an aperture stop is compensated comprising:

a compensating lens movably positioned, on an object side of the aperture stop, so that it is decentered relative to the optical axis in order to compensate for any blurring;

wherein as a focal length of said zoom lens system shifts from a shorter focal length condition to a longer focal length condition, the position of said compensating lens at least does not shift relative to said aperture stop or shifts toward the object side so as to be further away from the aperture stop; and wherein the following conditions are fulfilled:

$$0.22 \leq FL_w \times \Sigma(\Phi_i \times \Theta_i) \quad |\Phi_i| \geq 0.0087 \quad 0.5 \times F1_t \leq \nu_d$$

where $FL_w$ represents a shortest focal length of an entire system including the camera shake compensating optical system and the zoom lens system;

$\Phi_i$ represents a power of a refractive surface to be displaced due to the decentering of the compensating lens;

$\Theta_i$ represents an angle of optical inclination of the surface to be displaced with respect to an optical axis of said zoom lens system when the compensating lens is decentered so that a principal light beam from an object is bent by one degree in a counterclockwise direction by the camera shake compensating optical system;

$\Sigma$ represents a total sum of the product of $\Phi_i$ and $\Theta_i$ with respect to all of the optical surfaces to be displaced by the decentering of the compensating lens; and where $\nu_d$ represents the Abbe number.

* * * * *